US007730608B2

(12) United States Patent
Kvalheim

(10) Patent No.: US 7,730,608 B2
(45) Date of Patent: Jun. 8, 2010

(54) HINGE FEEDER

(75) Inventor: Andrew M. Kvalheim, Petaluma, CA (US)

(73) Assignee: Kval, Inc., Petaluma, CA (US)

( * ) Notice: Subject to any disclaimer, the term of this patent is extended or adjusted under 35 U.S.C. 154(b) by 1170 days.

(21) Appl. No.: 11/339,897

(22) Filed: Jan. 26, 2006

(65) Prior Publication Data

US 2007/0170198 A1 Jul. 26, 2007

(51) Int. Cl.
*B23P 21/00* (2006.01)

(52) U.S. Cl. ............................ 29/771; 29/712; 29/823; 29/11; 209/541; 209/600; 221/173; 221/175; 414/757; 414/758; 414/783; 414/816

(58) Field of Classification Search .................... 29/11, 29/709, 711, 712, 720, 771, 783, 791, 809, 29/810, 822, 823, 281.5; 221/156, 171, 173, 221/175; 414/754, 757, 758, 783, 799, 816; 209/1, 2, 540, 541, 600
See application file for complete search history.

(56) References Cited

U.S. PATENT DOCUMENTS 3,537,166 A * 11/1970 Matyas ...................... 29/281.5
3,543,372 A * 12/1970 Unglaube ...................... 29/11
3,772,757 A 11/1973 Goldstein
4,785,531 A * 11/1988 Roy et al. ...................... 29/798
4,837,916 A * 6/1989 Jangaard ...................... 29/434
5,222,290 A 6/1993 Kvalheim
5,331,732 A * 7/1994 Kvalheim .................... 29/787
6,398,004 B1 * 6/2002 Kvalheim ................ 198/345.1

FOREIGN PATENT DOCUMENTS

DE 2 047 214 11/1980

* cited by examiner

*Primary Examiner*—David P Bryant
*Assistant Examiner*—Christopher M Koehler
(74) *Attorney, Agent, or Firm*—Corwin R. Horton

(57) ABSTRACT

A hinge feeder for feeding open hinges at a predetermined orientation to a receiver ready for use by an automatic door hinger. A dispenser is provided to hold a stack of closed hinges. The orientation of the top end and hinge joint of each hinge is sensed and the hinges sequentially dispensed at a uniform orientation, except for the pinhead location, to a rotator that rotates those hinges to bring their top ends to a desired side. The hinges are then opened by a leaf turner, fed to a stacker and the opened and oriented hinges then deposited in a stack by a stacker.

21 Claims, 23 Drawing Sheets

HINGE FEEDER

BACKGROUND OF THE INVENTION

First, as background, door units for installation in building constructions comprise a door and a doorframe, the doorframe, in turn, comprising a doorjamb at either vertical side of the door and a header, the horizontal member above the door connecting the two jambs. Hinges attach the door to one of the jambs for opening and closing the door. Looking from the opening side of the door, if the hinges are attached to the left jamb, the door will be a right opening door. If the hinges are attached to the right jamb, it will be a left opening door. Such units are referred to as “prehung” doors.

Two or three hinges are normally applied, spaced apart along the door side edge and jamb margin. Hinges for doors typically are butt hinges which comprise two flanges or leaves that are joined together at adjacent margins with a pin extending along the margins from the top of the flanges to the bottom to form the hinge joint. The leaves are for applying the application side of the hinge against the receiving surfaces of the door and jamb. Typically, the receiving surfaces are prepared by routing out a pocket for each flange to a depth that the outer surface or face of each flange is flush with the adjacent door and jamb surface.

The leaves of a butt hinge are capable of rotating about the hinge joint from a door-closed position with their outer faces closed together to a door-open position with leaves rotating apart typically up to maximum arc somewhat greater than 270 degrees. Thus, when they are installed, as described above, with the application side of each hinge against the door edge and jamb face, the door may be pivoted between a fully closed position to a fully opened position.

There are fluted sections extending intermittently along each adjacent flange margin to form knuckles that cooperate to receive the pin. The two leaves each extend generally flat from the hinge joint to their respective free side margins opposed to their margins at the joint. They are generally without bends or outward projections so that they will nest in hinge pockets prepared in the surface of the door edge or jamb face with the inner (application) face applied against the door surface in the pocket and outer face of the leaf flush with the door edge or jamb face surface.

The hinge pin has a head at one end thereof larger than the openings of the fluted sections so that when the pin is inserted through the fluted sections the head remains at the top of the hinge above the upper ends of the flanges. The pin head end of the hinge is normally the upper end of the hinge when installed on a door. With the pinhead at the top end of the hinge the pin cannot accidentally slide down and out of the hinge. The flanges are each provided with openings therethrough for receiving screws to fix the hinge to the door margin and jamb face.

Door units may be fabricated using automated workstations, which apply hinges to connect a jamb face to one side edge of the door. In order to apply hinges at multiple locations along the side of the door using a stationary hinger either a separate hinger must be used for each site or a conveyor for the door and jamb must be used to move the hinge locations to a single stationary hinger. An example of the latter is shown in U.S. Pat. No. 3,772,757.

Alternatively, a hinger may be mounted on a carriage for movement between each hinge site to apply all of the hinges consecutively with the same hinger. Two hinges are normally applied, spaced apart along the door edge and jamb margin. Please refer to accompanying U.S. Pat. No. 5,222,290 of the present inventor for an illustration of this type of workstation.

In the workstation depicted there a door and a doorjamb are held with the appropriate door edge and jamb face in juxtaposition for receiving hinges therebetween at appropriate intervals. A carriage is mounted for movement along the door edge and jamb face (see the specification at column 4, lines 52-64). Various equipment mounted on the carriage prepares the door edge and jamb face for receiving the hinges, drills the screw holes, applies the hinges and drives screws through the hinges to fix them to the door edge and jamb face. The carriage contains a magazine with plate 332 carrying pins 330 for receiving opened hinges in a stack with their screw holes engaged in pins 330. Hinges are picked off of the magazine for application at the hinge sites along the door edge and jamb face by receiving block 50.

To apply the hinge to a door edge and jamb face, the hinge must be open with the application side thereof against the door edge and jamb surfaces so that after application of the hinge the door may be rotated about the pin to bring the door fully to the closed position with the flanges flat against each other and the door edge against the adjacent side of the jamb. Additionally, the hinge must be oriented so that it is applied with the head of the pin at top of the hinge and toward the top of the door.

This is accomplished with the apparatus of Patent No. ’290 by first stacking open hinges in the magazine with the closure side of the hinges facing upward and with their pinheads all in the same direction and with their application sides facing downward. Then screw and hinge block 50, with the block face horizontally, will pick up screws on the upper side and the uppermost hinge in the stack will be picked up magnetically on the opposite side. Then block 50 is rotated ninety degrees to bring the block face to the vertical with hinge flanges against the door edge and jamb face with the closure side facing outwardly of the door and jamb. As noted in column 9 of the patent, depending upon whether the door is to be right or left side opening, magazine 180 may be rotated one hundred eighty degrees as need so that pin head of the hinge is on the side of the hinge toward the top of the door.

A somewhat similar approach is shown in U.S. Patent ’757 where a bin contains a stack of opened and oriented hinges having their respective application sides facing downward. They are dispensed sequentially from the bottom to a location for loading with screws. Each hinge is then moved onto an adjacent horizontal plate at the hinge applying location which tips the screw-loaded hinge to the vertical to presenting it to the door and jamb. In either of the foregoing approaches provides no automatic means of forming the required stack of opened and oriented hinges.

Hinges are normally supplied for fabrication operations packaged stacked in containers with each hinge closed upon itself, i.e. with the flanges rotated about the hinge joint to bring them in abutting relationship with their outer faces against each other and with the hinge joint at one side of the flanges. Every other hinge in the stack is positioned with the knuckles and pin on the left side and the other hinges are positioned with their knuckles and pins on the right side. This allows the hinges to be stacked in a relatively vertical stack. The pin head sides of the hinges often are randomly placed to one side or the other. For use in automated hingers, all of the closed hinges must be opened and placed in stacks oriented so that their sides and ends, including top and bottom directions, are aligned and so that the application faces of their leaves are all at the same side.

When applied by hand in the conventional manner, the hinges are removed individually from the package, opened by hand and oriented to place the pin head at the top and then applied to the door and jamb. When automated equipment such as described in Patent '290 is employed, the hinges are preloaded by hand after first opening them by hand and then orienting them to have the head of each pin at the same end. This consumes both valuable machine time and operator time. Clearly devising an automated way to provide hinges to the hinger properly opened and oriented would be highly advantageous.

Previously automatic procedures have been proposed for opening hinges having "L" shaped hinges. United Kingdom Patent No. 2,047,214 discloses a procedure in which closed "L" shaped hinges are oriented in a bowl feeder and consecutively fed along a track having a stepped abutment along one side against which the hinge joint rests. A ram is pushed from the other side of the track against the free edge of the uppermost hinge leaf to cause this "L" shaped leaf to pivot upward ninety degrees to half open it. A second ram at a subsequent station then pushes downward against the now vertical free end of the uppermost leaf to pivot that leaf a further ninety degrees to fully open it. The opened hinge is then moved to an electro-magnetic pick that lifts it and applies it to a window sash frame. However this procedure is applicable only to an "L" shaped hinge because a flat leaf hinge does not lend itself to orienting by a feeding bowl and a closed flat hinge because of its flat configuration could not be opened effectively by application of a ram against the free end of the upper leaf.

SUMMARY OF THE INVENTION

This invention relates to feeding hinges and especially for forming stacks of hinges for applying the hinges to doors and door jambs, windows and the like and particularly pin-jointed butt hinges. By this invention such hinges may be sequentially opened and oriented for application with automated equipment to doors and other substrates. In carrying out this invention a pathway is provided for supporting hinges for movement therealong for hinge dispensing, turning, opening, receiving and stacking operations.

In this invention for feeding opened and oriented hinges, with the tops of each hinge at a selected end, a stack of closed hinges is formed and the lower-most hinge sequentially dispensed along a pathway with the end margins of the hinge at a uniform orientation, except for the location of the top of the hinge, which is, variably, at one or the other end of the hinge. Each closed hinge is sensed to determine the position of the pinhead at the top and, hence, the location of the hinge joint and top of each hinge. Those hinges for which the top have been sensed to be at the non-selected end are rotated to bring the top to the selected end of the hinge. All of the hinges are then opened and then fed to the receiver.

In an alternate procedure after the hinges are dispensed and sensed, those hinges that have been sensed to have the hinge joint at the side opposed to a selected side edge for the hinge joint are rotated to thereby bring all of the hinge joints to the selected side. All of the hinges are then opened. Following this, those hinges that had been sensed to have their tops at the selected end and the hinge joint at the non-selected side edge are rotated to bring their tops to the selected side. The hinges, thus opened and oriented with all their tops at the selected side, are fed to the receiver.

A pathway is provided along which hinges may be sequentially placed and moved downstream at a uniform attitude or orientation that permits orientation and opening operations to be carried out and the opened and oriented hinges moved to the receiver. Hinges may advantageously be placed on the pathway with a lower leaf resting on and supported by the pathway with their hinge joints transverse to the pathway.

Another feature of the invention is the provision of dispenser that holds and aligns a stack of closed hinges and sequentially dispenses the lower-most hinge in the stack downstream on the pathway with the lower leaves of the hinges resting on the pathway. The hinges are dispensed with a uniform (same) orientation of the hinge ends, except for the location of the tops of the hinges, as the hinges are typically stacked with their tops variably at one or the other end.

With this orientation the hinges may be placed on the pathway in a proper alignment with respect to the pathway for the operations to take along the pathway. Advantageously, that orientation is with the hinge ends parallel with the pathway and the hinge joint transverse to the pathway downstream direction.

Hinges so placed on the pathway may then be sensed for determining the position of the hinge joint and the top (pinhead) end of the hinge. The sensed hinges may then be sequentially moved downstream on the pathway for orienting to bring the top end to the desired side of the pathway, opened and the opened hinge moved downstream to a receiver.

Thus, an important feature of the invention is the provision of a sensor along the pathway to sense the location of the hinge joint of each hinge moving down the pathway for other operations along the pathway, including orientation of each hinge as to the location of the hinge pinhead side thereof and the position of the hinge joint side of each hinge with respect to the direction of the pathway. Advantageously, the sensor is positioned at the site of the lower-most hinge in the dispenser stack and includes sensor elements at all four corner positions at which the pinhead could be located to sense the position of the hinge joint and the top end of the hinge prior to movement of the lower-most hinge downstream from the dispenser.

A related feature is the provision of a plurality of dispensers that are each alternatively moveable from an auxiliary position off the pathway to an active position to an active position on the pathway for dispensing hinges.

A rotator may be provided on the pathway at or downstream of the sensor for further orienting the hinges and specifically as to the location of the top of each hinge. The rotator responds to a signal from the sensor as to the orientation of top of a particular hinge, when at the sensor, to turn the hinge, as necessary, to bring the top end of the hinge to a selected side of the pathway. The rotator desirably rotates the hinge about itself in the plane of the leaves and advantageously may be a device such as a turntable that supports the hinge from the underside and rotates carrying the hinge to the desired orientation, This turntable may take the form of an inverted vacuum cup that produces a partial vacuum under the hinge to hold it to the turntable as it spins.

Another feature of the invention is a leaf turner, composed of one or more devices that opens the hinge by movement of one leaf hinge leaf relative to the other about the hinge joint. In this invention a device may be employed that raises the hinge upper leaf up from the lower leaf and at the same time moves the upper leaf in the direction of the hinge joint. Thus the device may provide a force to lift the free side of the upper leaf of the closed hinge away from the lower leaf on the pathway and urge the upper leaf to move in the direction of the hinge joint, thereby to rotate about the hinge joint to the open position. Advantageously, a magnetic, suction or mechanical force may be applied for this purpose by device capable of applying the force in an upward arc above the upper foil of a hinge on the pathway and toward the hinge joint side of the hinge. The leaf turner performs this function in response to the signal generated by the sensor as to the sensed orientation for each hinge, when at the sensor. The closed hinges to be opened by the leaf turner have the application faces of their leaves in abutting relationship and the outer face of the lower leaf resting on the pathway. Thus, when they are opened with the leaf turner by rotation of the upper leaf, both of the application faces of the leaves are brought to the top and the outer faces of both leaves are directly against the pathway.

In an important embodiment of the invention the leaf turner of this invention is composed of two leaf turning devices. In this embodiment closed hinges are fed downstream along the pathway to the dispenser with the ends of the hinge parallel with the pathway and the hinge joint transverse to the pathway. One of the turning devices is arranged to open those hinges reaching the leaf turner that have their hinge joint on the downstream side. The other device is arranged to open those hinges having their hinge joints on the upstream side. Actuation of each of these devices may be based upon the signal from the sensor. Thus, the downstream turning device is actuated for hinges sensed to have the hinge joint on the downstream side and the upstream turning device actuated for hinges sensed to have the hinge joint on the upstream side.

Alternatively, the two leaf turning devices may be used without the sensor if the closed hinges in the dispenser stack have been pre-oriented with all of the tops at the same end and every hinge in the stack having its joint at the opposite side from the next-adjacent hinges. In this case the turning devices may be set to operate alternatively, i.e. each opening every other hinge. The devices are first synchronized with the hinge flow so that the downstream device actuates for the hinges with downstream joints and the upstream device actuates for hinges with upstream joints.

Another feature of the invention is a stacker located in the pathway downstream of the rotator and the turner and adapted for picking up each open hinge, consecutively, moving downstream on the pathway and transporting it to a position above the receiver with the leaves maintained open and at horizontal attitude and depositing the hinge at that attitude into the receiver to form the stack.

BRIEF DESCRIPTION OF THE DRAWINGS

FIG. 12A is an expanded and more detailed fragmentary overhead view of the apparatus of FIGS. 1A and 1B showing the stacker for lifting hinges from the conveyor and depositing them on a receiver, with the stacker in the lowered and retracted position, with the stacker arms in the spread position to permit a hinge to be moved along the conveyor to a position adjacent the arms for grasping by the stacker;

DETAILED DESCRIPTION OF THE PREFERRED EMBODIMENT

The following description illustrates the manner in which the principles of the invention are applied but is not to be construed as limiting the scope of the invention.

The hinge feeders of this invention are intended for feeding hinges to automatic hinging operations for joining a door edge and a jamb face. They may also be used for feedings hinges for other hinging operations and in other contexts, for example, for preloading magazines or cartridges which may be installed manually in the hinging equipment in place of a depleted magazine or cartridge.

When used directly with an automatic hinging operation having stationary hingers, a hinge feeder may be stationed permanently at a position for feeding hinges one by one to the respective hinger for application to the door and jamb.

In other automatic hinging operations the hinger may be mounted on a carriage with associated machinery to traverse to the hinge sites along the door edge for applying hinges to doors and door jambs at those sites, as described in my U.S. Pat. No. 5,222,290. The carriage moves on rails along the door edge to hinge locations carrying the automatic hinger, including a hinge applicator, screw feeder, hinge feeder and automatic screwdrivers. In this operation a hinge feeder of this invention may be stationed along the path of travel of the hinger to feed hinges to the hinge magazine on the carriage. The hinger moves on to apply the hinges along the door edge and jamb face and then returns to the hinge feeder to replenish its magazine.

Figure 3:
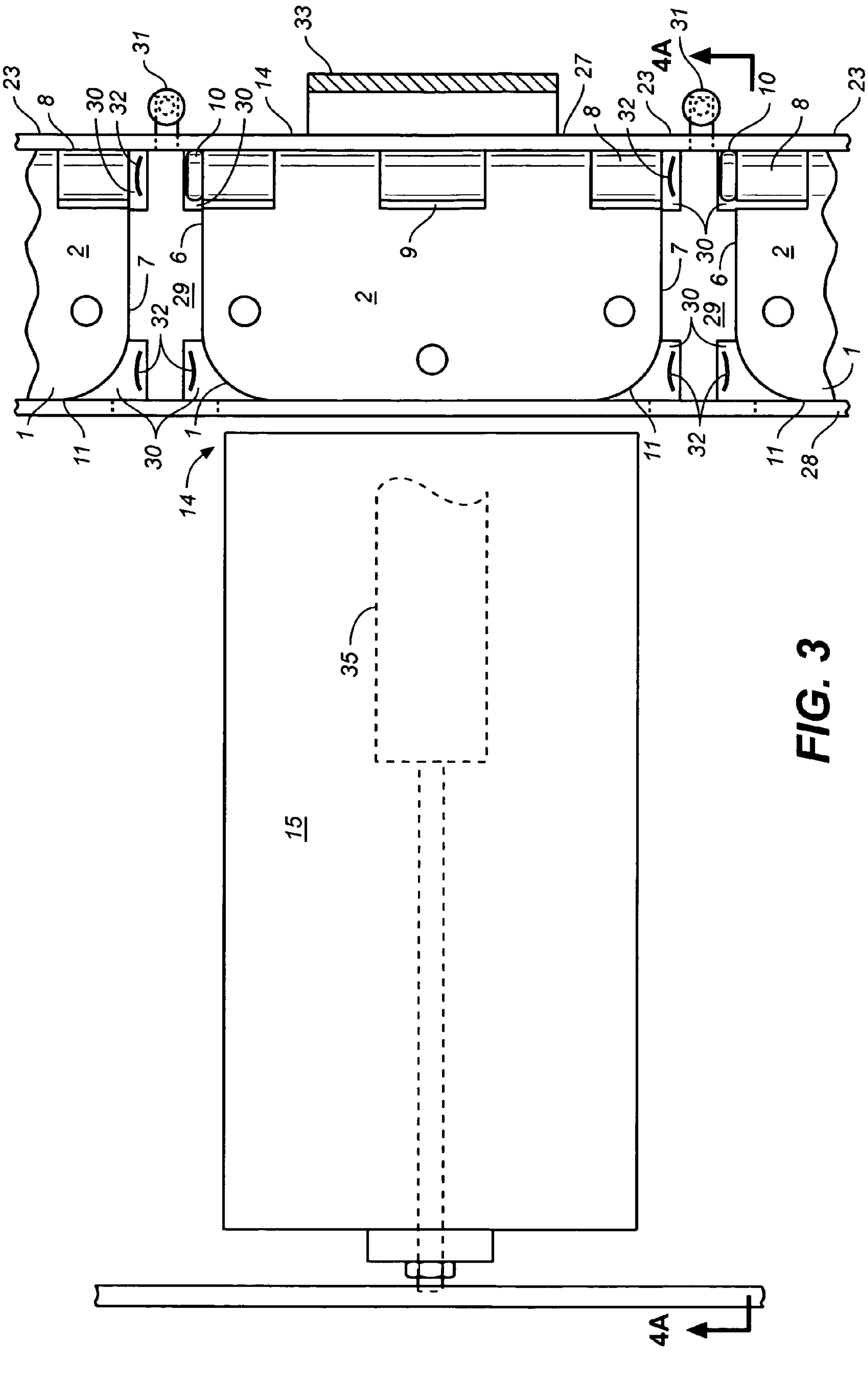
FIG. 3 is an expanded and more detailed fragmentary overhead view of the central chamber of the dispensing unit of the apparatus of FIGS. 1A and 1B also showing the hinge pusher.
Figure 3A:
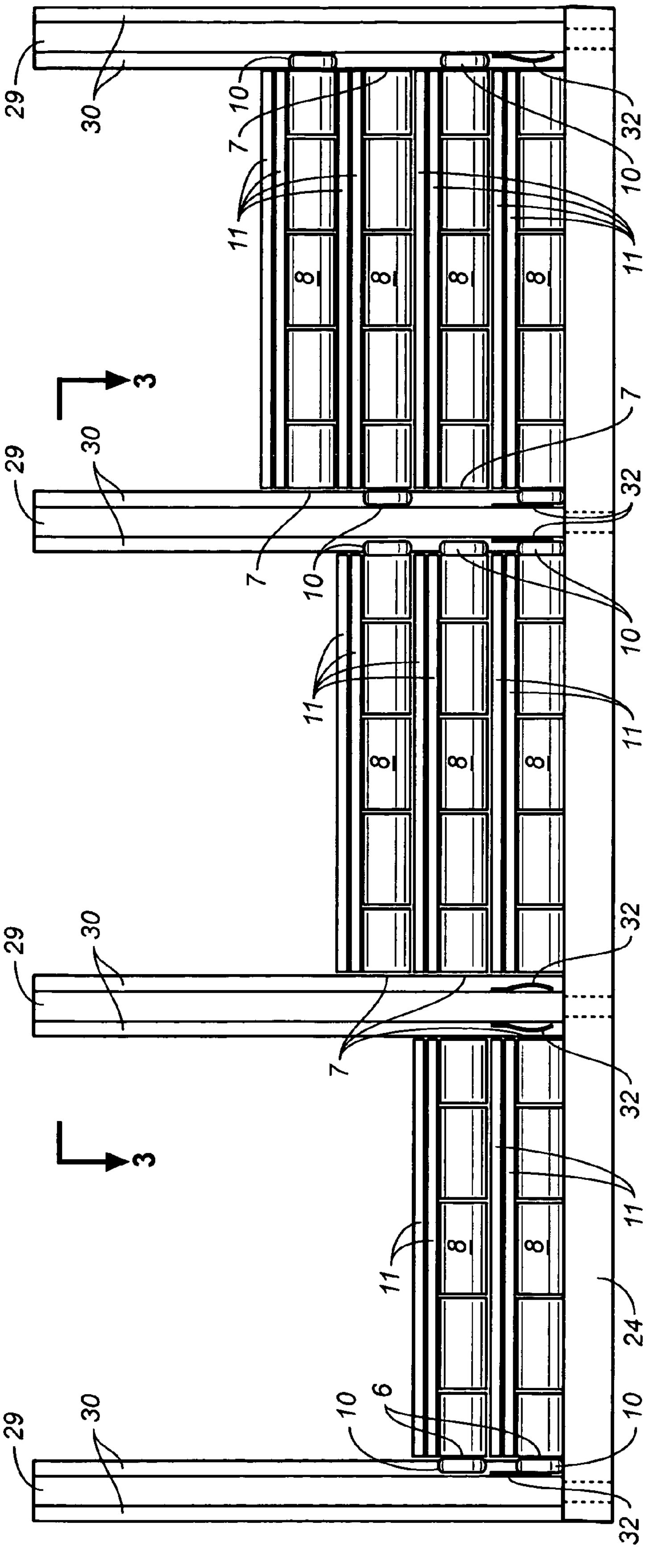
FIG. 3A is a view of the dispensing unit of FIGS. 1A and 1B taken along lines 3A in FIG. 4A showing the interiors of the chambers.

The hinges to be fed in accordance with this invention are particularly those commonly employed in housing construction, especially pin-jointed butt hinges 1, as shown in FIGS. 2A through 2D, 3, 4A and 4B of the drawings, typically employed for hanging doors and the like. Referring particularly to FIG. 3, butt hinges 1 each comprise two generally flat, planar flanges or leaves 2 which are typically rectangular but the free side margins may be curved toward the ends. The leaves are joined together at adjacent side edge margins with a pin 3 extending along the adjacent side margin from the top end 6 of hinge 1 to the bottom end 7 to form the hinge joint 8. There are typically fluted sections extending intermittently along each adjacent flange margin to form knuckles 9 that cooperate to receive the pin 3. The pinhead 10 on pin 3 is at the top end margin of leaves 2 and protrudes a distance thereabove. Pinhead 10 is of a larger diameter than the shank of pin 3 so that pin 3 does not fall out the hinge knuckles. The two leaves 2 each extend generally flat from the hinge joint side to their respective free side margins 11 opposed to their margins at the joint 8. They are generally planar, without bends or outward projections so that the leaves may be mortised flush with the edge of a door and a jamb.

The closed hinges 1 are stacked with the outward face of the lower leaf of each hinge abutting the outward face of the upper leaf of the next lower hinge. The hinge joint at one of the side margin is considerably thicker than the abutting free side edges at the other side margin together. This limits the ability to form a vertical stack so in this invention the hinge joint margins of adjacent hinges in the stack are usually placed on opposite sides.

A preferred embodiment of the invention is depicted in FIGS. 1A through 13D. In this embodiment hinges 1 are sensed to determine whether the hinge joint is at a selected side margin or at the side margin opposite and whether the top end is at a selected end location or at the end opposite. They are dispensed along a pathway to be each oriented so that they all have their top ends are all facing the selected direction, either to one side or the other of the pathway. The hinges are then sequentially opened by turning the upper leaf of each in the direction of the hinge joint side, either the upstream or downstream direction. The hinges, now opened and having the same orientation, are then passed along the pathway to the stacker.

The selection of the top end orientation to be achieved for all of the hinges by the foregoing is determined based upon the orientation of the hinges needed for feeding them the hinger or other destination. It is necessary for a hinger to apply hinges 1 oriented with the top end 6 toward the top of the door. Therefore all of the hinges fed to the hinger must have their top ends oriented to the side that will allow the hinger to apply them with their top ends toward the top of the doors being hinged.

To further illustrate the above procedure, FIGS. 2A through 2D show, in the first column under "Dispenser" closed hinges 1 in each of the four possible alternative orientations. The hinges are first sensed to determine these orientations, and particularly the side of hinge joint 8 and the side of the top end 6 of each relative to the pathway.

Figure 1A:
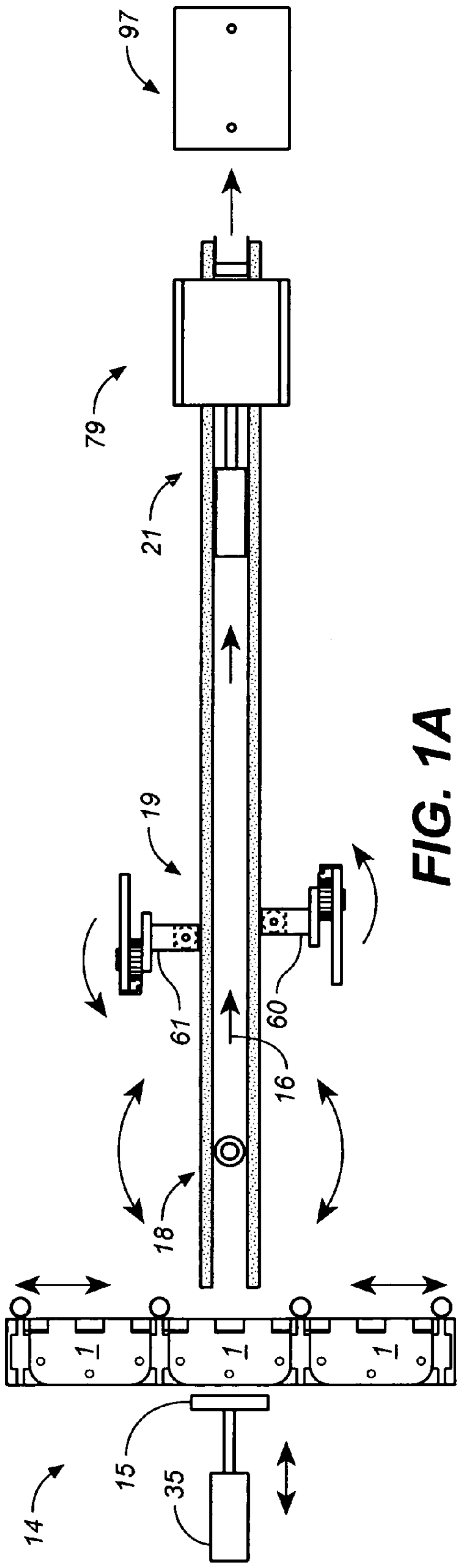
FIG. 1A is an overhead view of an embodiment of the apparatus of the present invention for forming a stack of closed hinges, sensing the orientation of individual hinges in the stack, consecutively separating individual sensed hinges from the stack, orienting the hinges for placement in a receiver opening the hinges, and depositing the hinges in a receiver.
Figure 1B:
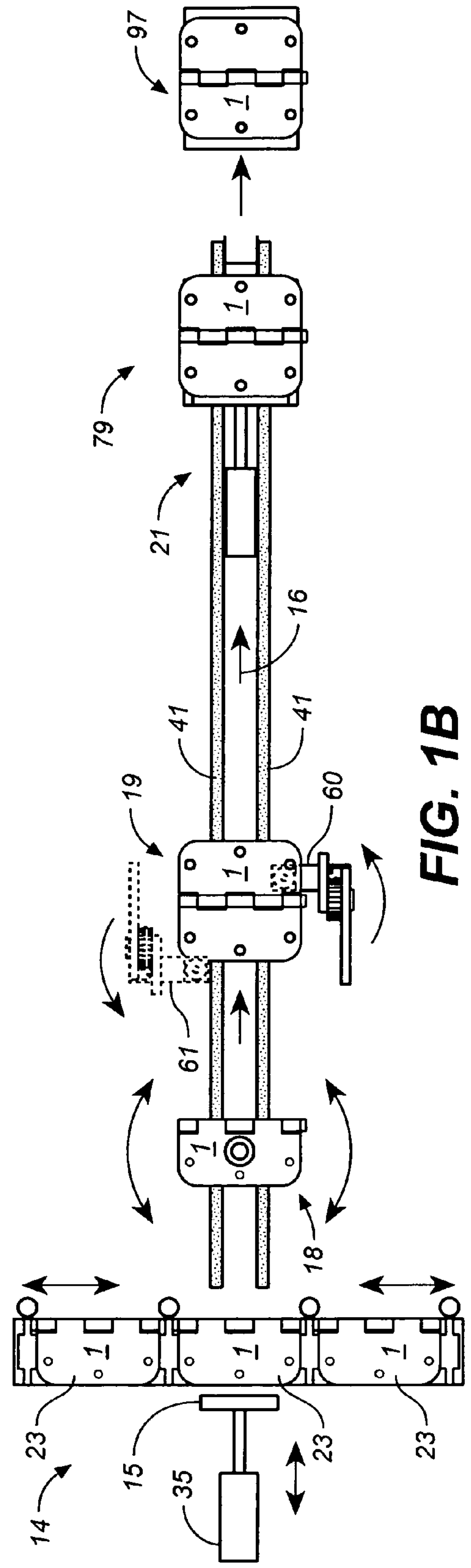
FIG. 1B is the same overhead view of the apparatus as in FIG. 1A showing hinges separated from the stack and progressing through the sensing, opening, orientating and depositing of the separated hinges.
Figures 2A, 2B, 2C, 2D:
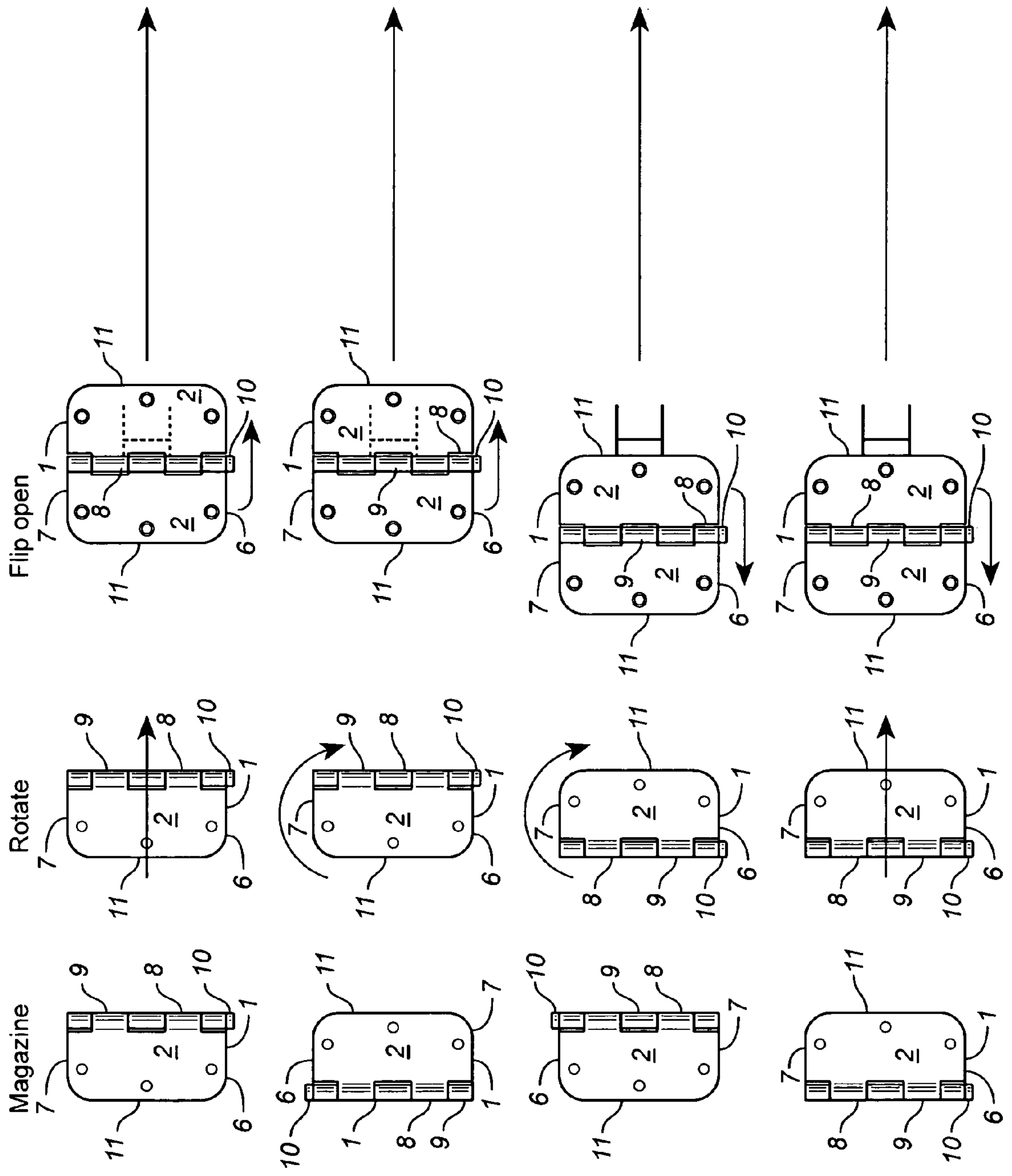
FIG. 2A through 2D is an overhead view of hinges along four pathways at various stages of being rotated and opened from closed hinges having the four possible alternative initial orientations, illustrating the procedure of the embodiment of the invention of FIGS. 1A and 1B.
Figure 2E:
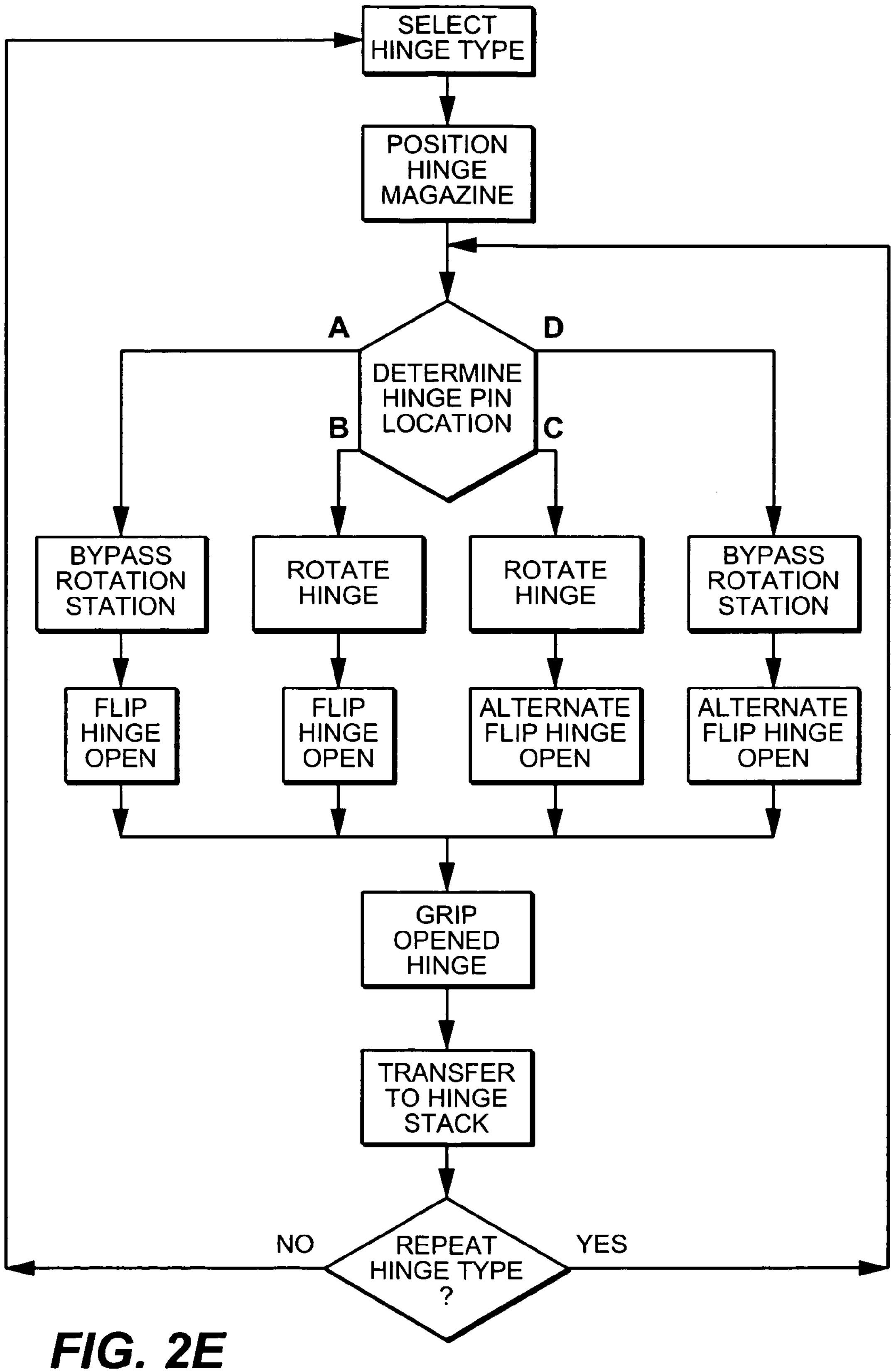
FIG. 2 is a block diagram illustrating the procedure of dispensing, orienting, opening and stacking hinges in the embodiment of FIGS. 1A and 1B and 2A through 2D.

Following dispensing and sensing of the hinges, as seen in the second column under "Rotate," the hinges of the rows of 2B and 2C are each rotated to bring their top ends 6 to the selected side. The hinges of rows 2A and 2D pass through the rotation station without rotation since they have their top ends 6 already on the selected side. Next, as seen in the column headed Flip open," the hinges of rows 2A and 2B have been opened by turning the upper leaves in the downstream direction of their hinge joints 8. The hinges of rows 2C and 2D have been opened by turning the upper leaves in the downstream direction. A self-explanatory flow diagram of the foregoing procedure is seen in FIG. 2E Turning now to FIGS. 1A and 1B, an overall view is provided here of the various components of a hinge feeder 12 representing a preferred embodiment of this invention. The components of hinge feeder 12 include a dispensing unit 14 for dispensing closed hinges, including a pusher 15 for pushing the lower-most hinge in a vertical stack of hinges in the dispensing unit out from under the stack and onto a pathway 16. A rotator station 18 is positioned along the pathway for orienting closed hinges that move to this station along from dispenser unit 14. A hinge leaf turning station 19 is located downstream along the pathway for opening hinges that move to this station from rotator station 18. A stacker 21 downstream of turning station 19 picks up opened and oriented hinges that move downstream along pathway 16 from leaf turning station 19 and deposits them one-by-one onto a receiver 22.

Referring to FIGS. 1, 1B and 3 through 5C, dispensing unit 14 is composed of a line of three side-by-side vertical chambers 23 in an integral unit, each open at their tops and bottoms and sized to each receive and support a stack of closed hinges. As shown in 5A through 5C, chambers 23 are mounted on a table 24 for sliding movement therealong as will be described. Hinge pusher 15 is positioned on table 24 adjacent the line of chambers. A pair of pusher pistons 25 are mounted on table 24 to work cooperatively to move the chambers back and forth in their line direction to alternatively bring each adjacent to pusher 15, as seen in the alternative positions of 5A through 5C.

Figure 4A:
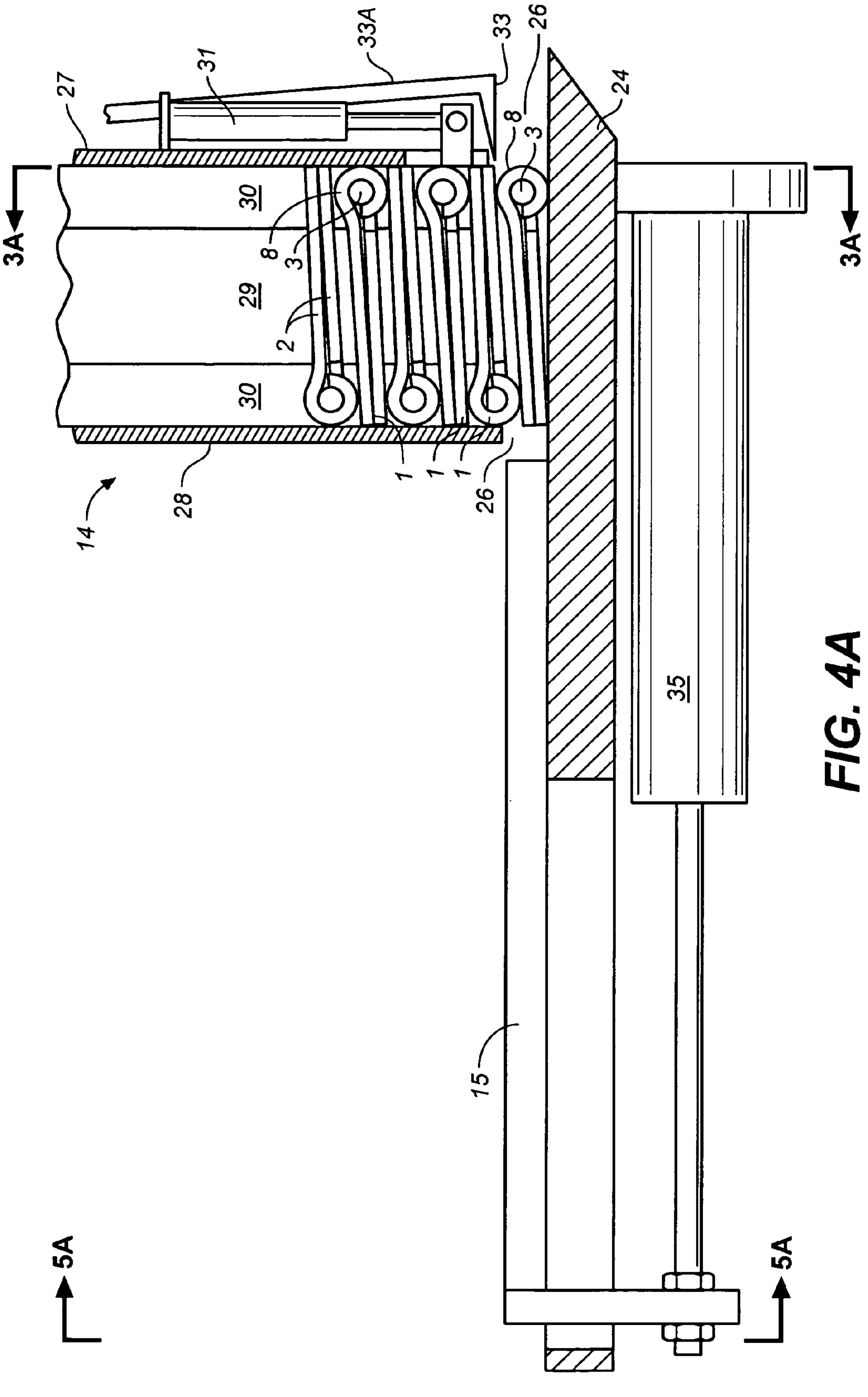
FIG. 4A is an expanded and more detailed fragmentary side view of the dispensing unit of the apparatus of FIGS. 1A and 1B taken along lines 4A in FIG. 3 showing the central chamber in cutaway.

As seen in FIG. 4A each chamber 23 has a slot opening 26 at the bottom of its back wall 28 to allow passage of pusher 15 through back wall 28 and into the chamber. Each chamber has another slot opening 26 in front wall 27 across from opening 26 in the back wall to allow passage of a folded hinge therethrough out of the chamber when propelled by pusher 15. Chambers 23 are sized to closely fit the contours of hinge 1 when closed. Sidewalls 29 of chambers 23 have at each corner a vertical groove 30 big enough to accommodate pinhead 10 of hinge 1. This permits the closed hinges to be stacked in chambers 23 with pinhead 10 at any of the four corner grooves 30.

At the bottom of each chamber 23 is an array of sensor elements as follows. In each groove 30, adjacent the lower-most hinge in the stack, is a flexible conductive strip 32 mounted in electrical isolation from the chamber walls by appropriate insulation and extending into the respective groove. One of the two corner positions at one side or the other will be the location of the pinhead of the lower-most hinge, depending upon which side the hinge joint side margin of that hinge is located. The conductive strip at the groove where the pinhead 10 of lower-most hinge is located will be in contact with this pinhead. The conductive strips 32 at the other three corners will not be electrical contact with the lower-most hinge. Each strip 32 is electrically connected through circuitry (not shown) to generate an electrical signal when strip 32 is in contact with pinhead 10. There will be no signal given for the conductive strips 32 at the other three grooves 30 as they are out of contact with hinge 1.

Pusher 15 is mounted for reciprocal movement over table 24 between a retracted position behind the row of magazines or kchambers 23 to a forward position through back wall slot opening 26 and into the bottom of the adjacent chamber 23. A piston 35 is mounted below table 24 and connected to pusher 15 to effect its reciprocation.

Figure 4B:
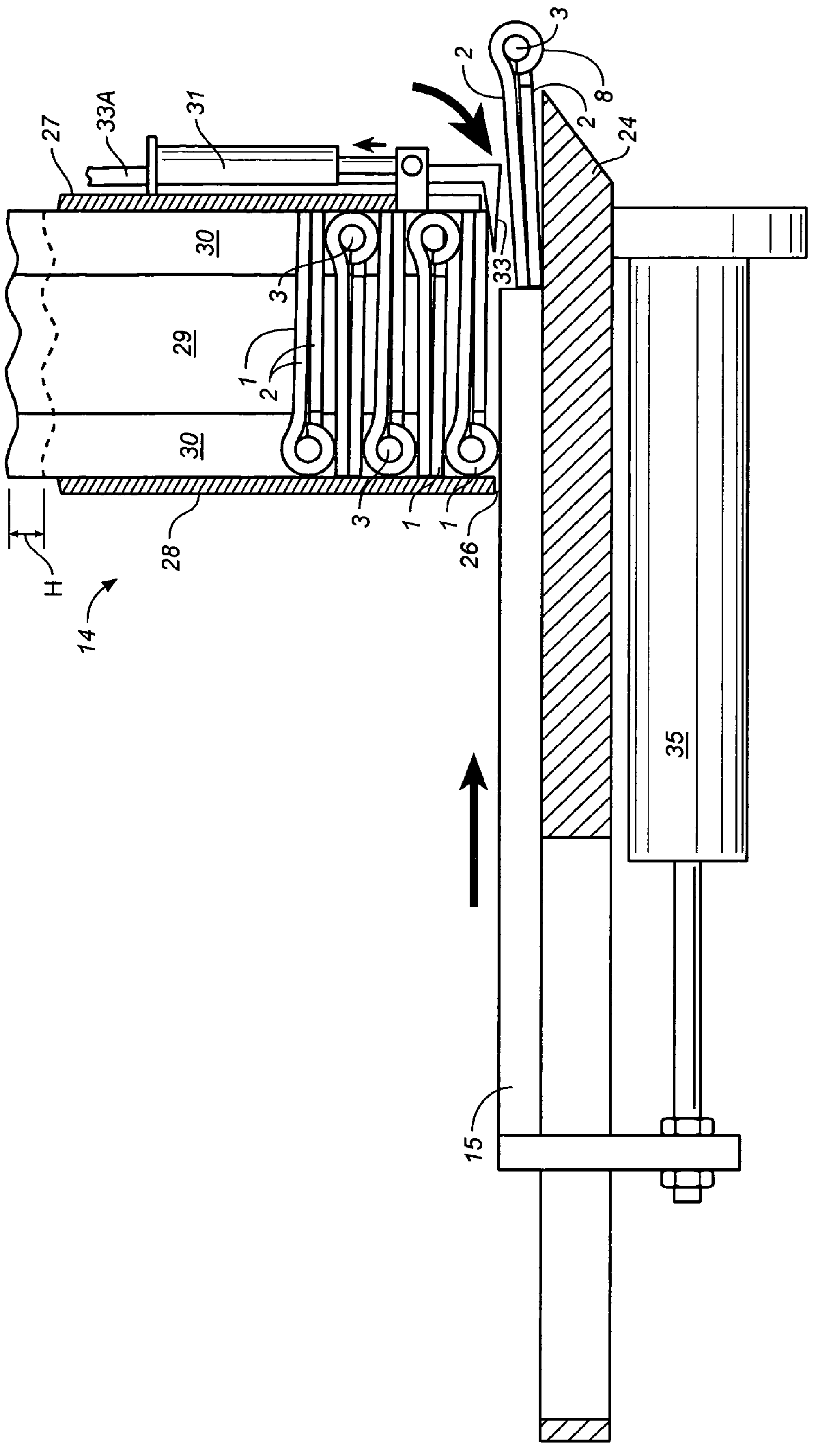
FIG. 4B is the same view as in FIG. 4A but showing the hinge pusher pushing the bottom hinge out of the hinge stack of the central chamber.
Figure 5A:
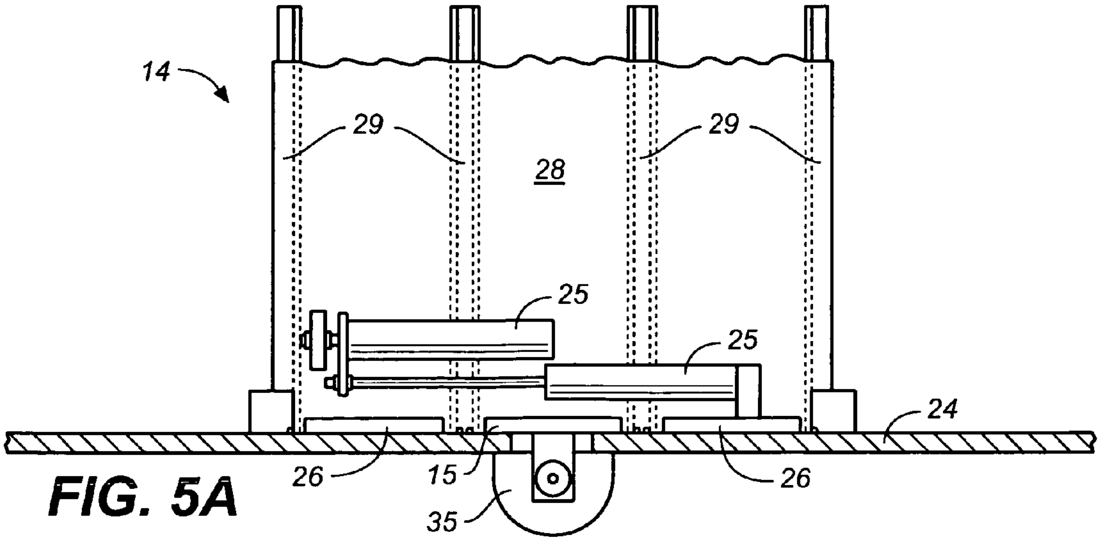
FIG. 5A is a front view of the apparatus of FIGS. 1A and 1B taken along lines 5A in FIG. 4A showing the dispensing unit chambers.
Figure 5B:
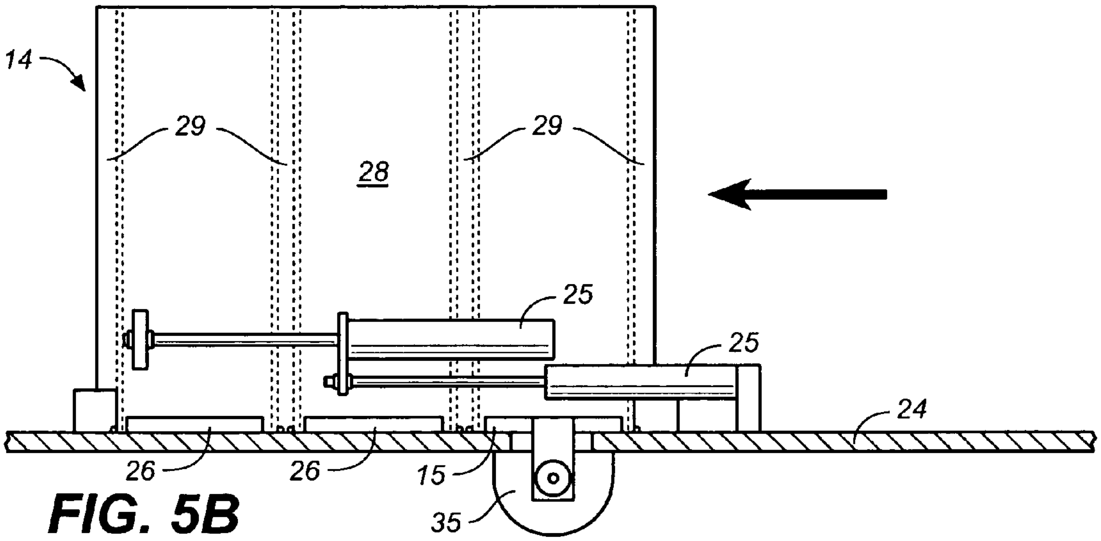
FIG. 5B is the same view as in FIG. 5A but showing the right dispenser chamber aligned with the hinge pusher, the conveyor and the workstations.
Figure 5C:
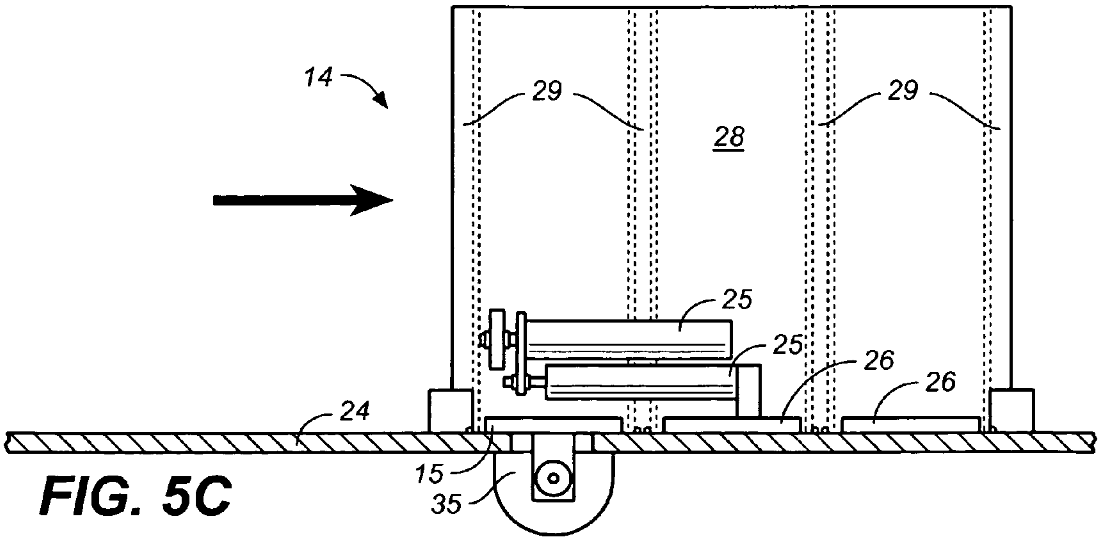
FIG. 5C is the same view as in FIG. 5A but showing the left dispenser chamber aligned with the hinge pusher, the conveyor and the workstations.
Figure 6A:
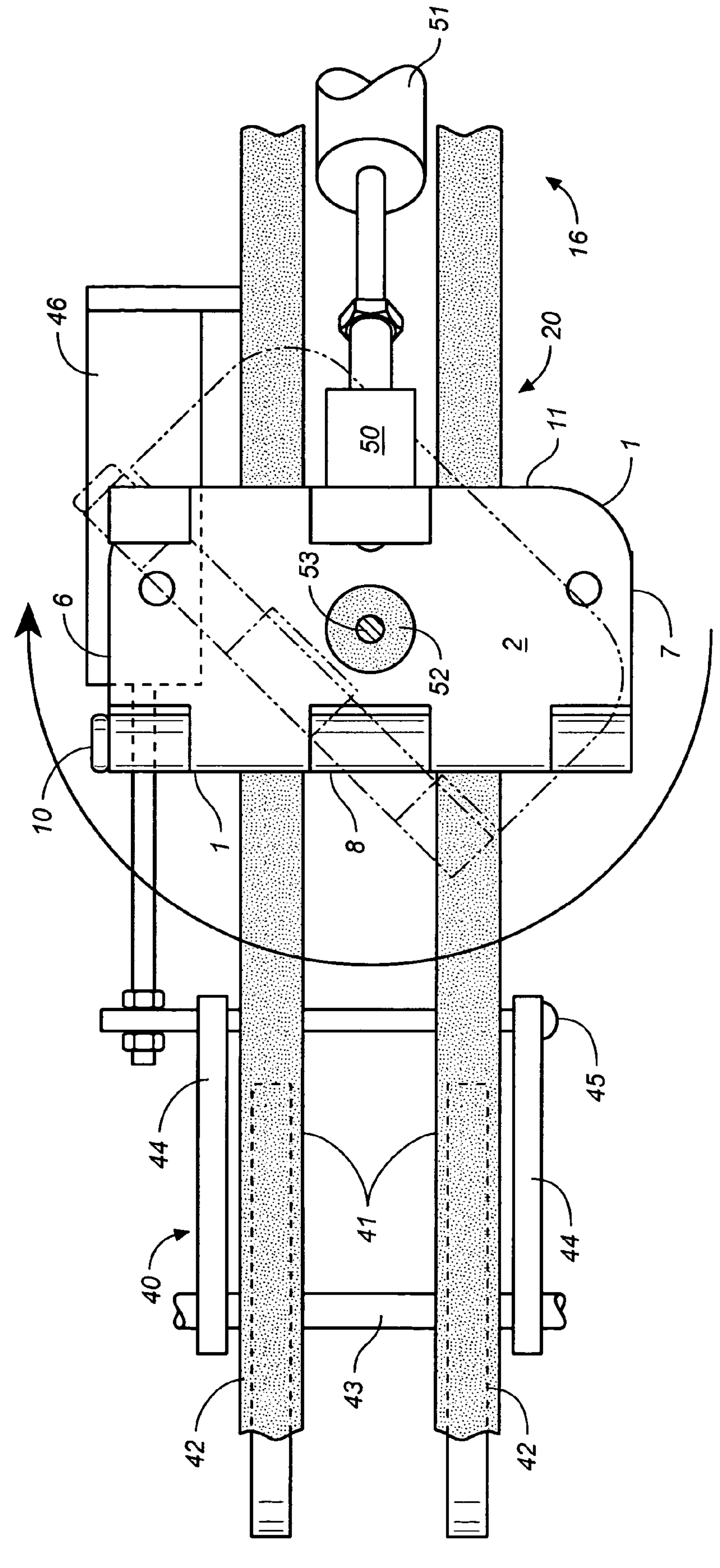
FIG. 6A is an expanded and more detailed fragmentary overhead view of the of the apparatus of FIGS. 1A and 1B showing the workstation for rotating the hinge, with a hinge being rotated.
Figure 6B:
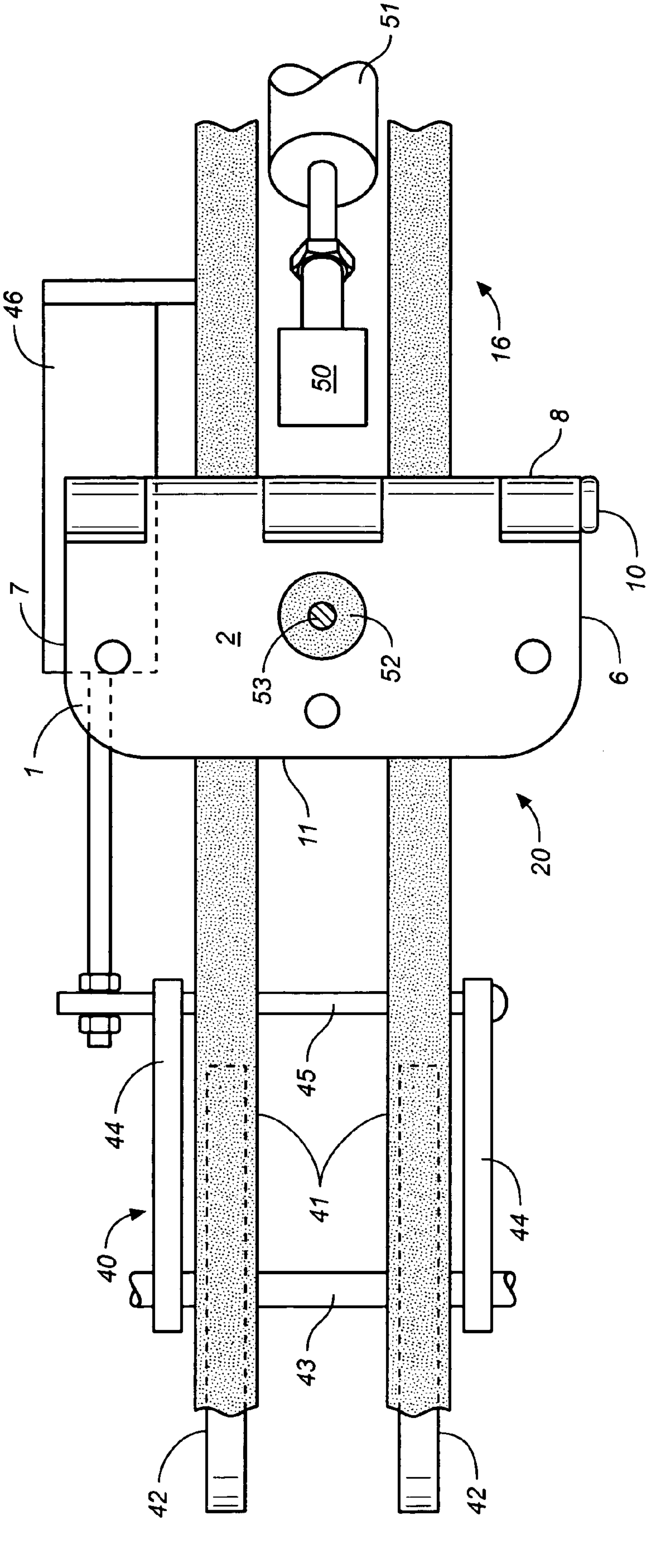
FIG. 6B is the same view as in FIG. 6A but showing the hinge in the fully rotated position and with the hinge stop retracted.
Figure 7A:
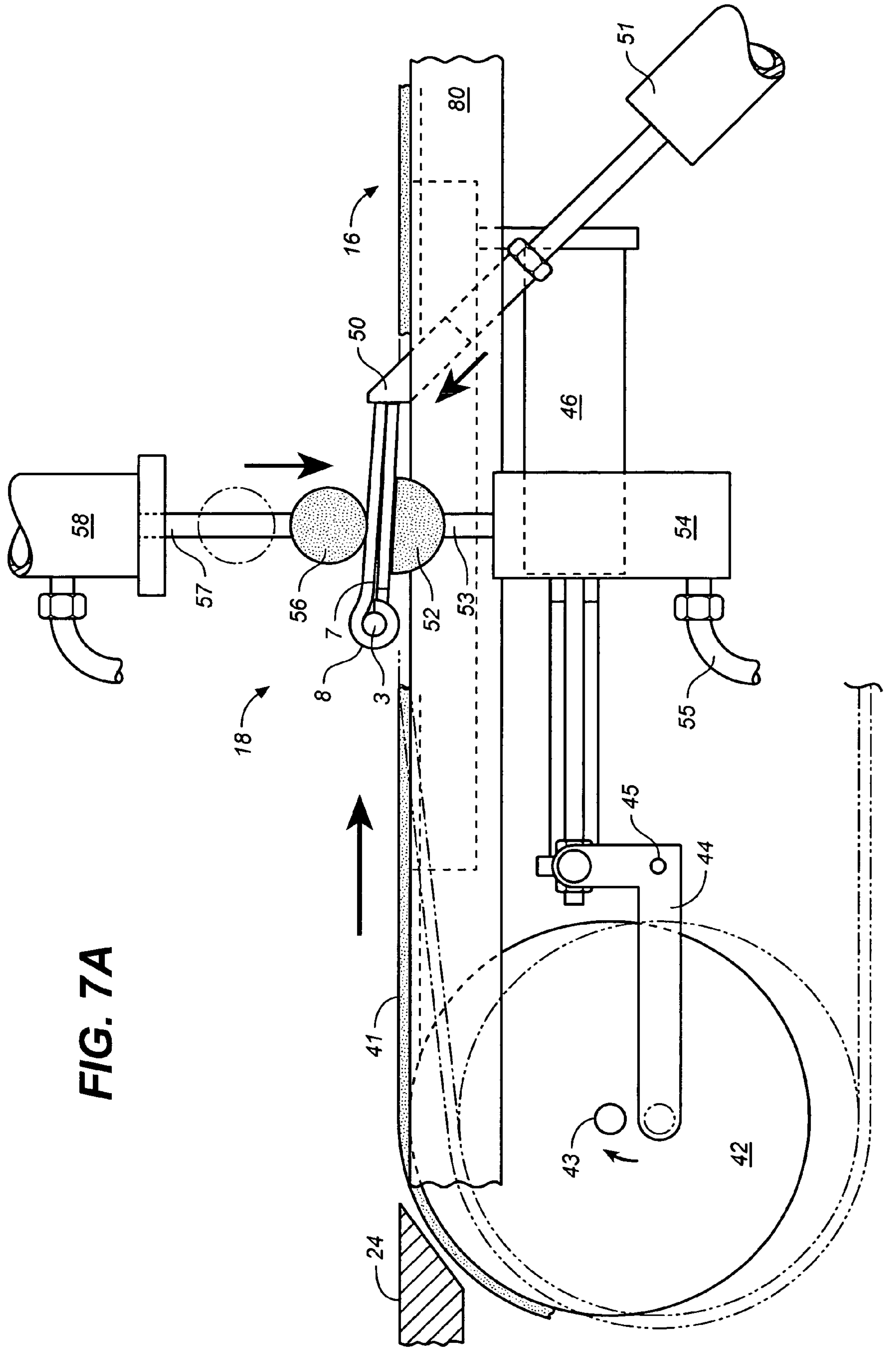
FIG. 7A is an expanded and more detailed fragmentary side view of the apparatus of FIGS. 1A and 1B showing the workstation for rotating the closed hinge for this embodiment of the invention, showing the rotator in operational mode with a hinge prior to rotation thereof and showing in dotted outline the conveyor belt, rotator holddown and the hinge stop in their retracted positions.
Figure 7B:
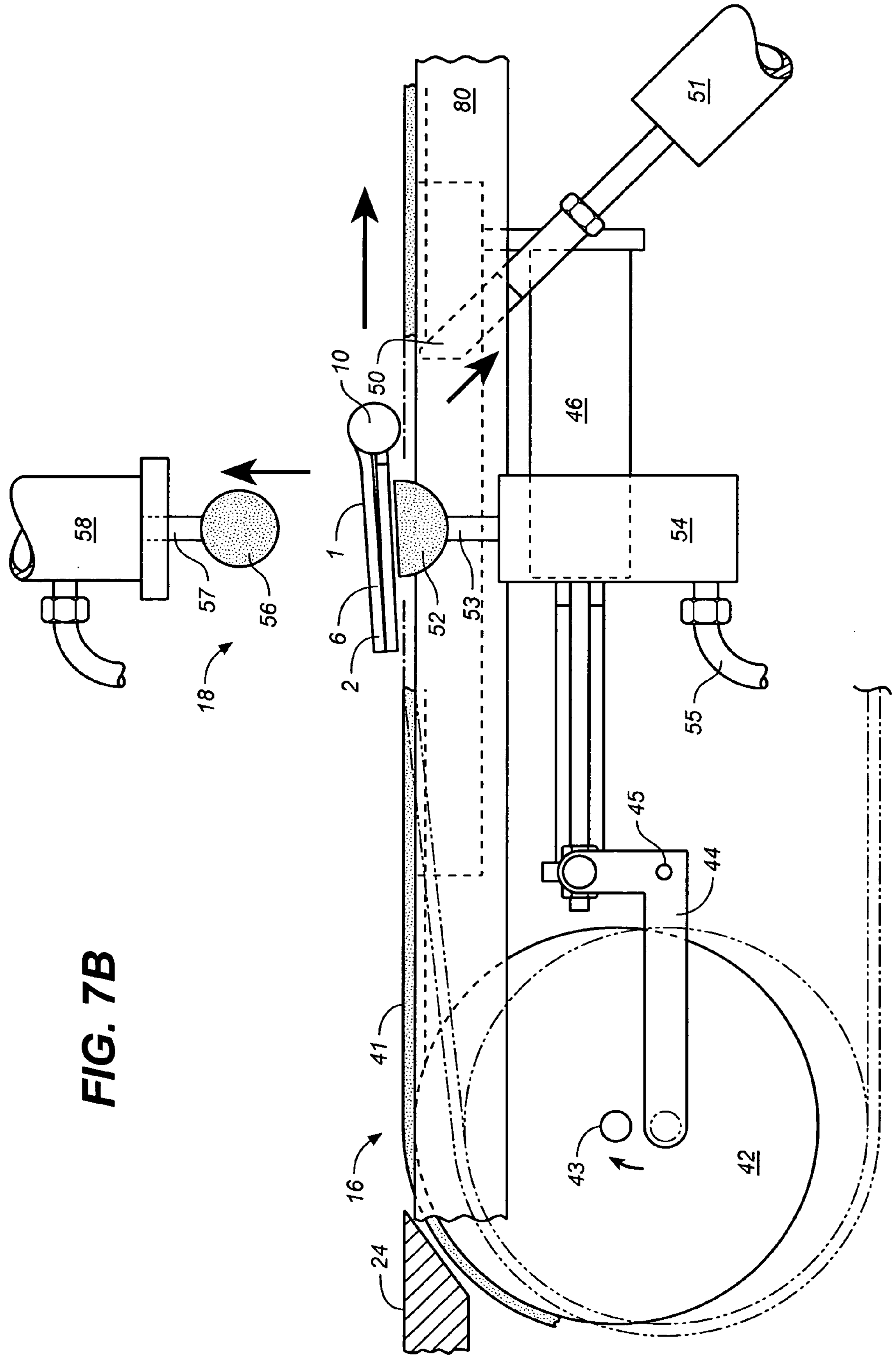
FIG. 7B is the same view as in FIG. 7A but showing the hinge in the fully rotated position and with the hinge stop and the holddown retracted.
Figure 8B:
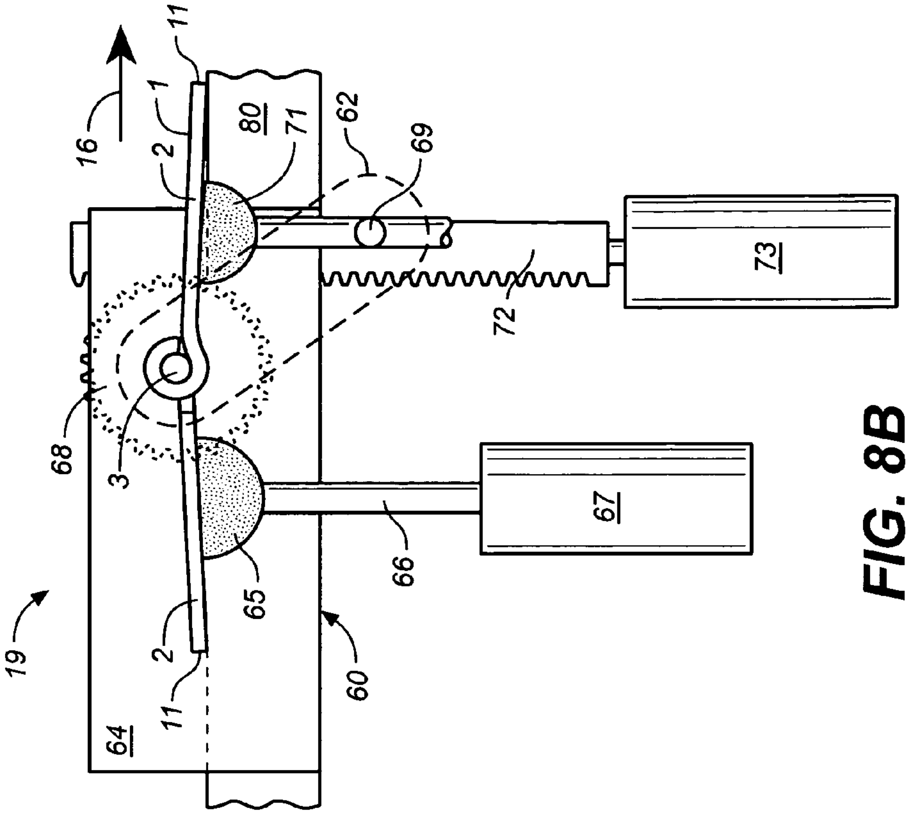
FIG. 8B is the same view as in FIG. 8A but showing the hinge after it has been opened.
Figure 8A:
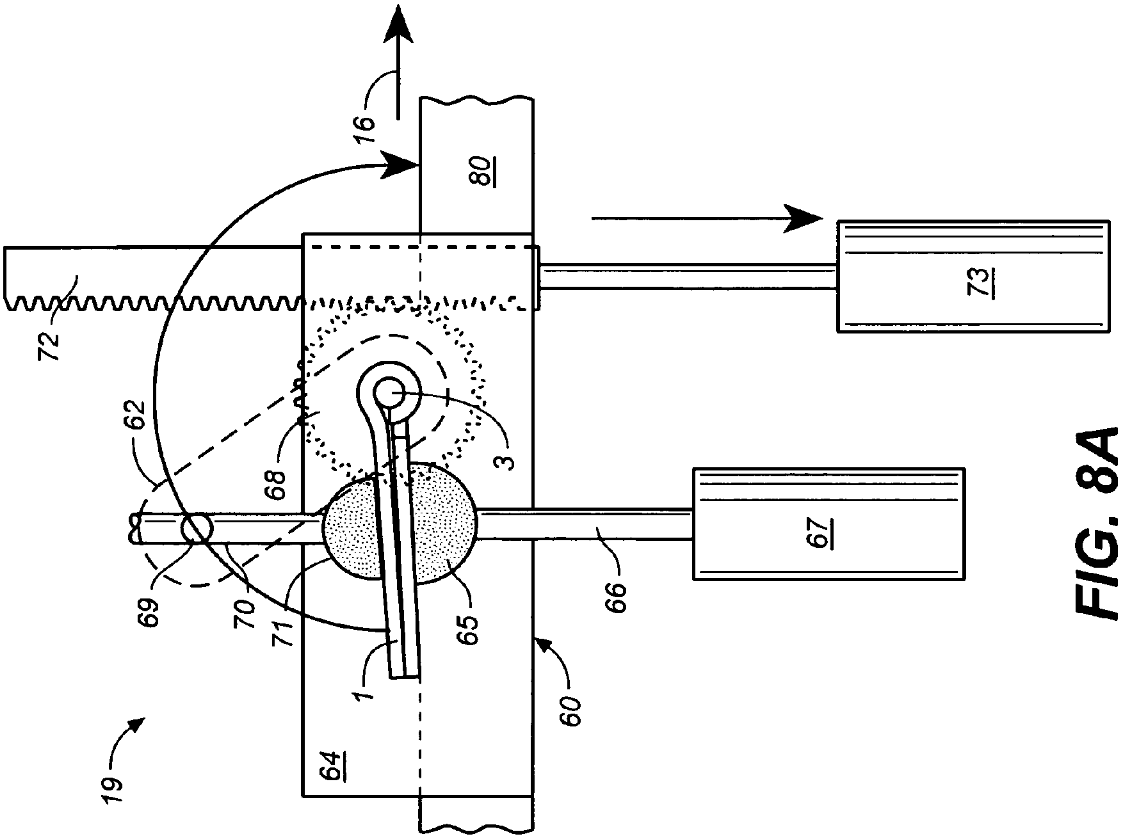
FIG. 8A is an expanded and more detailed fragmentary side view of the apparatus of FIGS. 1A and 1B showing the leaf turner for flipping and opening hinges for this embodiment of the invention, with a closed hinge having its hinge joint on the downstream side of the hinge and in place for opening.
Figure 9B:
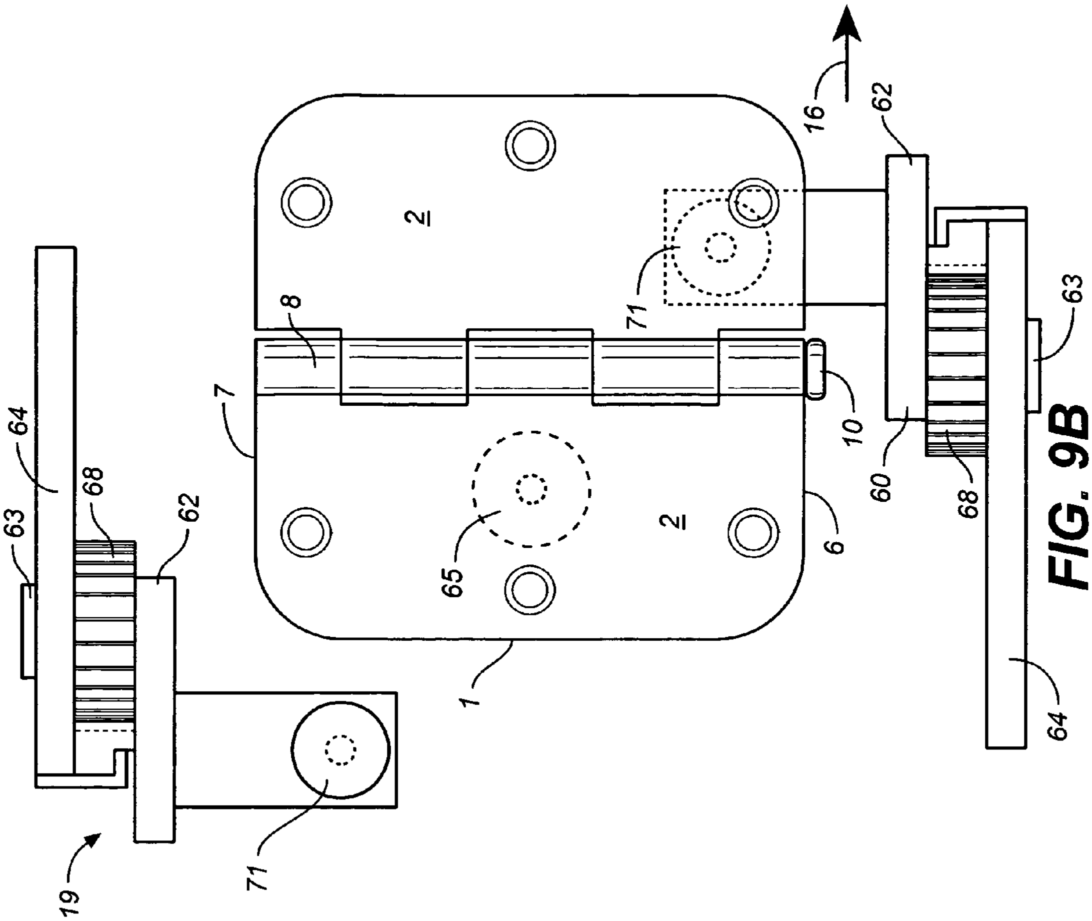
FIG. 9B is the same view as in FIG. 9A but showing the hinge after it has been opened.
Figure 9A:
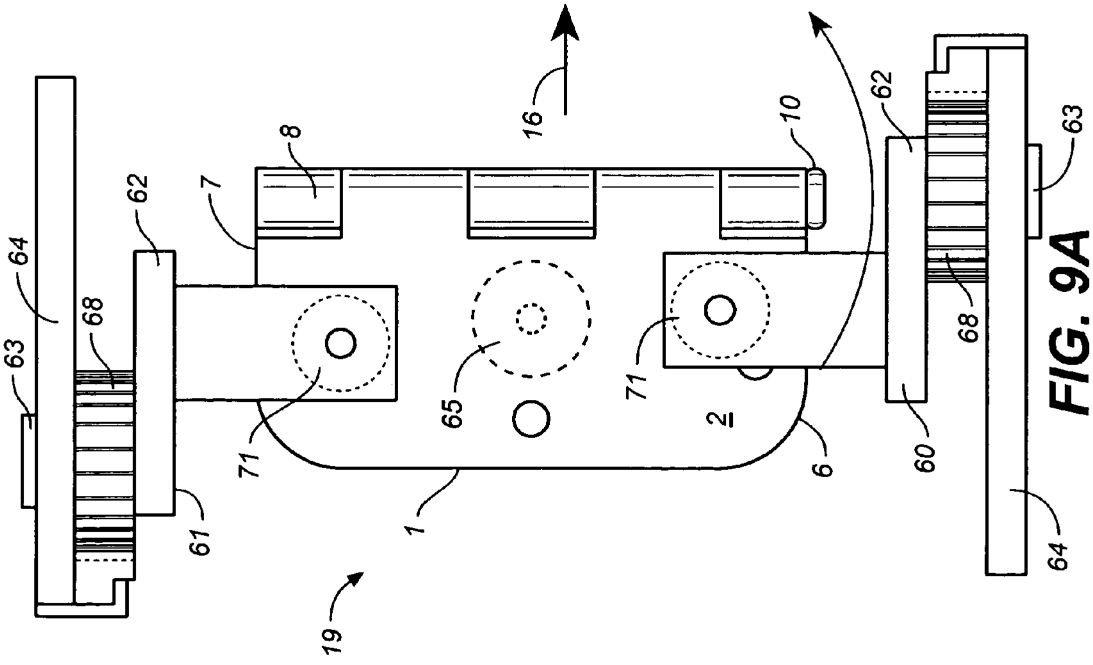
FIG. 9A is an expanded and more detailed fragmentary overhead view of the apparatus of FIGS. 1A and 1B showing the workstation for flipping and opening the closed hinges for this embodiment of the invention and showing a closed hinge in position to be opened with the hinge joint side on the downstream side of the hinge and in place for opening.
Figure 10B:
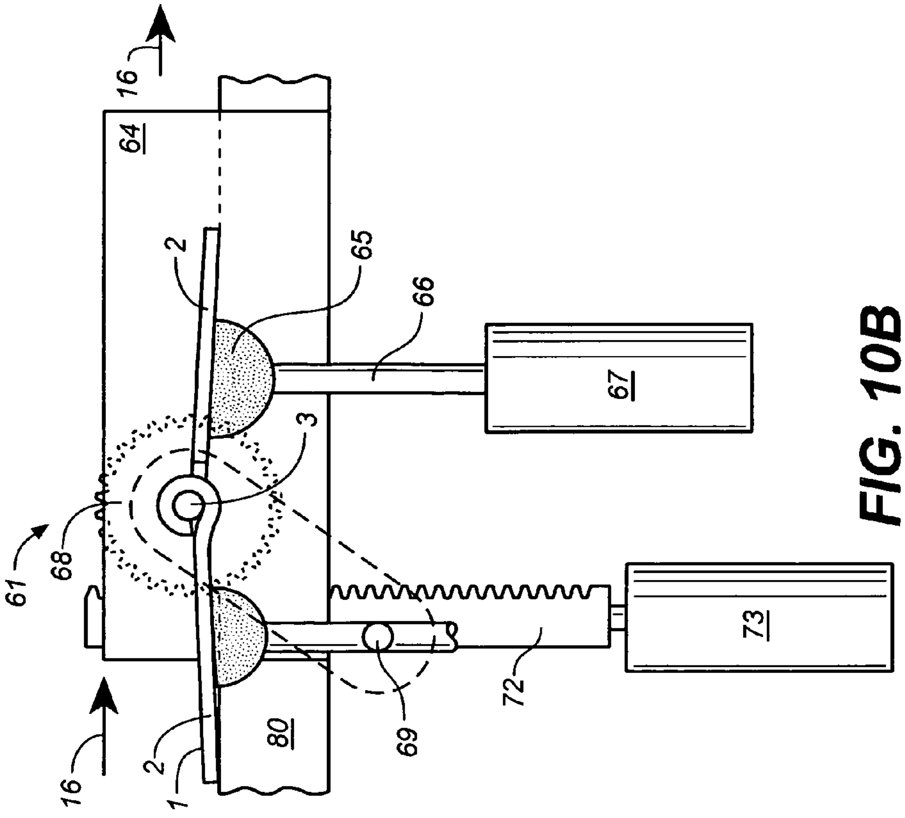
FIG. 10B is the same view as in FIG. 10A but showing the hinge after it has been opened.
Figure 10A:
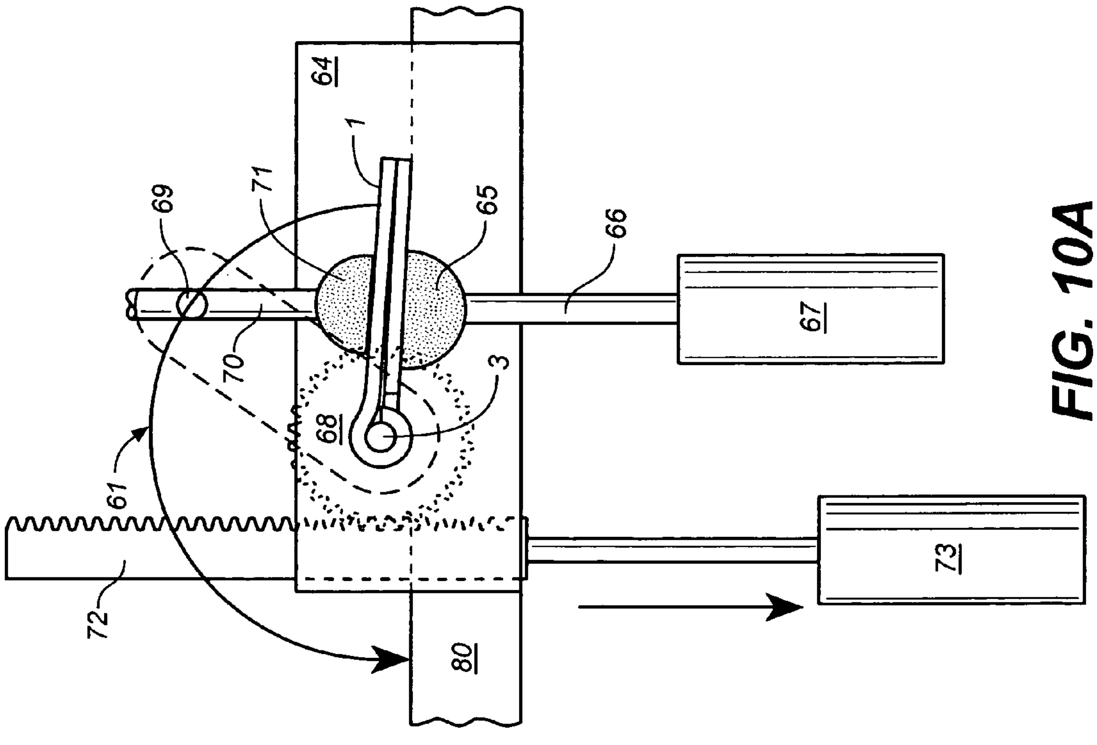
FIG. 10A is the same view as in FIG. 9A but showing a closed hinge at the workstation position to be opened with the hinge joint side on the upstream side of the hinge and in place for opening.
Figure 11B:
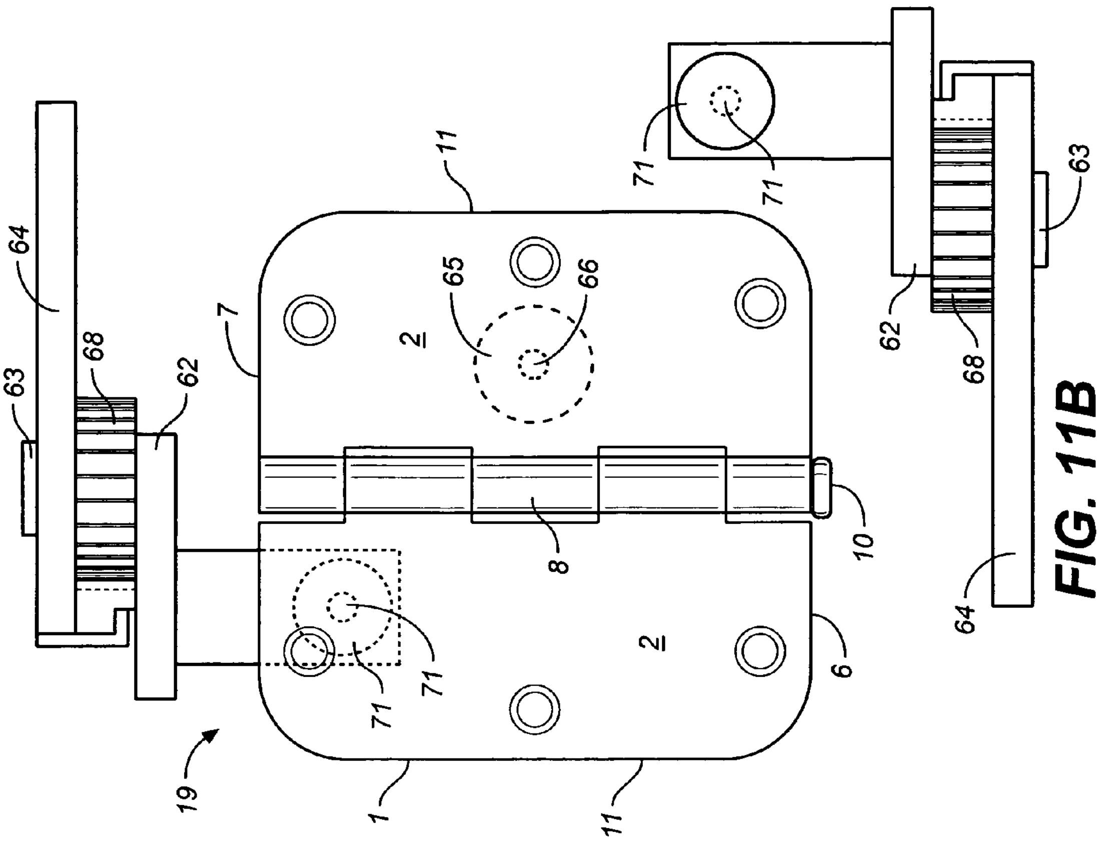
FIG. 11B is the same view as in FIG. 11A but showing the hinge after it has been opened.
Figure 11A:
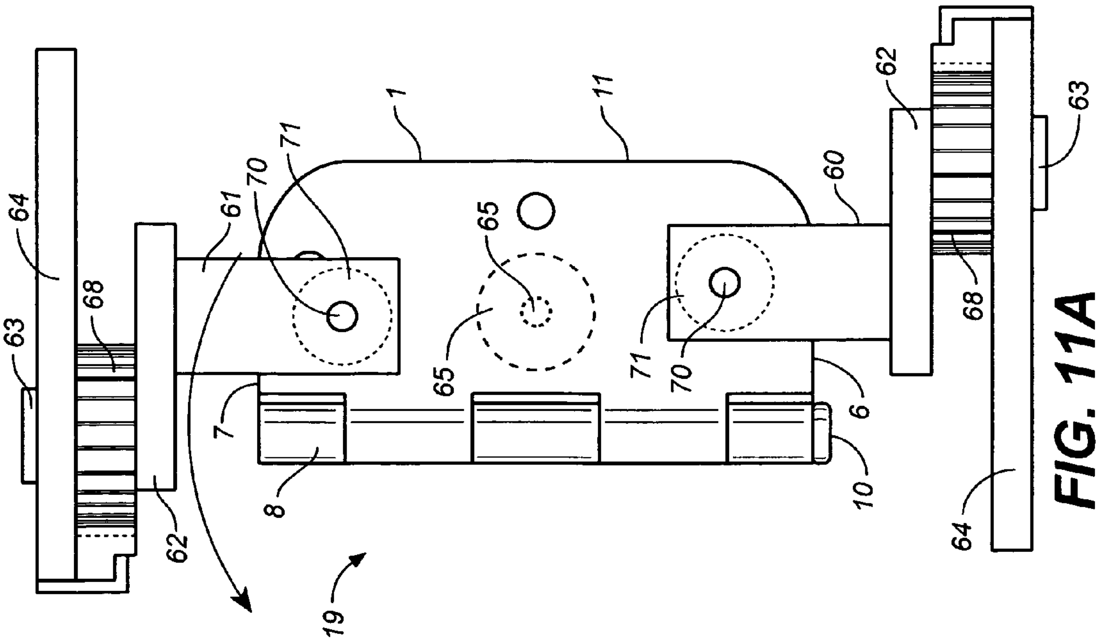
FIG. 11A is the overhead view of the apparatus of FIGS. 1A and 1B as in FIG. 9A but showing a closed hinge in position to be opened with the hinge joint side on the upstream side of the hinge and in place for opening.

Each sidewall 29 of each chamber 23 is moveable vertically from table 24 a distance H, as shown in FIG. 4B. This is effected by a respective piston 31 secured at each chamber between front wall 27 and each respective sidewall 29 of the chamber. This allows clearance for pinhead 10 of the lower-most hinge to move horizontally out of the chamber when engaged by pusher 15.

A pick 33 on a pivotably mounted on a shaft 33A is normally positioned at a retracted position outside the chamber, as shown in FIG. 4A. Prior to pushing the bottom-most hinge out of the stack, pick 33 is pivoted a short distance into the chamber at the top of front wall opening 37 to a holding position above the lower-most hinge and under the leading edge of the hinge immediately above the lower-most hinge. At this position pick 33 holds the hinge immediately above from being dragged out of the stack with the lower-most hinge. Pick 33 is returned to its retracted position following dispensing of the lower-most hinge.

Thus, in preparation for dispensing a hinge the lower-most hinge is sensed to determine location of hinge joint 8 and top end 6, the side walls 29 are lifted above the lower-most hinge by piston 31 and pick 33 is pivoted to its holding position. Pusher 15 then propels the lower-most hinge sideways over table 24 out of the stack horizontally and in a direction perpendicular to the hinge joint 8.

With reference to FIGS. 6A through 7B, the entry of a conveyor 40, comprising two parallel spaced conveyor belts 41 borne on drive pulleys 42, is located at the back walls 28 of chambers 23 immediately adjacent the edge 39 of table 24. Pusher 15 sequentially pushes the lower-most hinge sideways out of 20 the stack along table 24 and onto conveyor belts 41 with the hinge joint transverse to the path of the conveyor belts. As shown in 7A and 7B, the axle 43 of drive pulleys 42 is mounted on lever arms 44 having a pivot 45 for moving axles 43 between a lower and an upper position by actuation of piston 46 attached to lever arm 44. Moving axles 43 to the lower position brings belts 41 to a lower position for purposes that will be described.

Immediately downstream along conveyor 40 is rotator station 20. At rotator station 20 a detent 50 mounted on piston 51 is centered between conveyor belts 41 and, upon actuation of piston 51, moves between a retracted position below belts 41 and an extended position extending above belts 41 and into the path of hinges moving downstream to rotator station 20. Upstream of detent 50 at rotator station 20 is turntable 52 mounted for rotation on the shaft 53 of rotary motor 54. Turntable 52 is below conveyer belts 41 when conveyor belts 41 are at their upper position, When belts 41 are at their lower position the top of turntable 52 is slightly above belts 41. Turntable 52 constitutes a vacuum cup from which air may be evacuated through a tube (not shown) extending down shaft 53 and through motor 54 to vacuum source 55.

Directly above turntable 52 is a hold down 56 in the form of a rubber ball mounted for rotation on the shaft 57 of rotary motor 58. Hold down 56 is movable vertically between a raised inactive position, a shown in dotted outline, and the lowered active position shown in FIG. 7A where it bears against the top flange of closed hinge 1.

In response to a signal, based upon the positioning of hinge joint 8 and pinhead 10 detected by sensor array 31 for this particular hinge, that this hinge 1 needs to be turned to bring the tops of all the hinges passing the rotator station to the same selected side of the pathway the rotator section takes the following actions. When the hinge moves downstream from dispensing unit 14 on conveyor 40 it is stopped at station 20 by actuation of detent piston 51 to move detent 50 to the extended position to block further downstream movement of the hinge, bring hinge 1 to a position immediately above turntable 52. At the same time conveyor belts 41 are moved to their lowered position by operation of lever arm 44 so that hinge 1 becomes supported on turntable 52. Also at the same time, hold down 56 is moved to its lowered position to pin hinge 1 between turntable 52 and hold down 56. Also, detent piston 51 is actuated to move detent 50 back to the retracted position to so as not to block rotation of this hinge or to block passage of subsequent hinges not requiring rotation.

Then, both turntable 52 and hold down 56 are rotated in the same direction by their respective motors 180 degrees to bring hinge top end 6 to the opposite side of pathway 16. Upon completion of the rotation, hold down 56 is returned to its retracted position and lever arm 44 is operated to bring conveyor belts 41 back to the upper position. In this mode, the rotation procedure may be performed on subsequent hinges for which a signal is received that it should be turned. Otherwise each such hinge will move past rotation station 18 without a rotation.

After hinges pass rotation station 18 they will proceed along pathway 16 to leaf turner 19. Referring now to FIGS. 8A through 11B, leaf turner 19 has a pair of leaf turning devices, a downstream leaf turning device 60 that is for turning the upper leaves of hinges 1 having their hinge joint 8 on the downstream side and upstream leaf turning device 61 that is for turning the upper leaves of hinges 1 having their hinge joint 8 on the upstream side. As seen in FIGS. 1A and 1B leaf turning devices 60 and 61 lie on opposite sides of conveyor belts 41 at the same position along pathway 16 and each has a respective operating arm 62 extending a distance into the hinge pathway 16 but still to the outside of conveyor belts 41. Arms 62 are each mounted for rotation about a respective axle. Axles 63 are coaxial, positioned directly across pathway 16 from each other, and each is fixed to a respective support 64.

At leaf turner 19 a single vacuum cup 65 is mounted on a shaft 66 and positioned below and equidistantly between belts 41 and with its top level with the tops of belts 41. Shaft 66 is mounted on support 67 by means of which shaft 66 is movable vertically between a disengaged position below and an engaged position slightly above belts 41. Shaft 66 is tubular and vacuum cup 65 has an opening that communicates with the internal opening along the length of shaft 66. Shaft 66 at its opposite end (not shown) communicates with a vacuum source When a closed hinge 1 moves along pathway 16 to turner 19, it reaches a turning position where vacuum cup 65 is midway, in the pathway direction, between the hinge joint 8 and the opposed free side margin 11 of upper leaf 2 of the hinge. With hinge 1 at the turning position, vacuum cup 65 may be moved from its disengaged position to its engaged position against leaf 2 and a vacuum applied to raise and hold hinge 1 at a fixed position above belts 41.

The arm 62 at each of turning devices 60 and 61 is fixed at its respective axle 63 to a respective gear wheel 68 which is also mounted for rotation about the respective axle 63. Each arm 62 includes a respective connector 69 to which is rigidly attached a respective shaft 66 carrying at its opposite end a vacuum cup 71. Each shaft 66 is tubular and each vacuum cup 71 has an opening, which communicates with the internal opening along the length of its respective shaft 66. Each shaft 66 at its opposite end (not shown) communicates with a vacuum source.

Each axle 63 is situated relative to belts 41 and pathway 16 to be essentially coaxial with the hinge joint axis of a hinge 1 when the hinge 1 reach the turning position established by the location of vacuum cup 65. This coaxial turning position is the position at which hinges 1 are to be turned, either by turning devices 60 or 61. Each shaft 66 is sized and positioned at an angle on its connector 69 such that when a hinge 1 is at the coaxial turning position with cup 65 in the engaged position, the respective arm 62 may be rotated to a position that brings the respective vacuum cup 71 to a connecting position flush with upper leaf 2. Each shaft 66 is also sized and positioned so that the connecting position of the respective vacuum cup 71 is centered midway between the hinge joint 8 and the opposed free side margin of upper leaf 2 and shaft 66 perpendicular to the surface of upper leaf 2.

The gear wheels 68 for each of turning devices 60 and 61 meshes with a respective rack 72, each operable by a piston 73 to rotate the respective gear wheel 68. Each respective arm 62 is rotatable by its respective rack 72 and gear wheel 68 in the clockwise direction starting from the connecting position to a releasing position below belts 41. Turning devices 60 and 61 are facing the pathway from opposite sides so arm 62 of device 60 rotates in the downstream direction and arm 62 of device 61 rotates in the downstream direction.

The respective vacuum cups 71 of turning devices 60 and 61 are normally at a position a short distance above their respective connecting positions. When device 60 is activated to open a particular hinge 1 arriving at leaf turner 19 with its hinge joint 8 on the downstream side, vacuum cup 65 is brought to its engaged position with vacuum applied to vacuum cup 65 to raise the hinge above belts 41 and hold the lower leaf from turning during opening of the hinge. A vacuum is then applied to vacuum cup 71 of turning device 60 at the connecting position and arm 62 rotated in the clockwise direction to move upper leaf 2 of hinge 1 together with vacuum cup 71 in the downstream direction, to open the hinge and leave the formerly upper leaf 2 lying against belts 41 in the downstream direction.

Conversely, when turning device 61 is activated to open a particular hinge 1 arriving at leaf turner 19 with its hinge joint 8 on the upstream side, vacuum cup 65 is brought to its engaged position with vacuum applied to vacuum cup 65 to raise the hinge above belts 41 and hold the lower leaf from turning during opening of the hinge. A vacuum is then applied to vacuum cup 71 of turning device 60 at the connecting position and arm 62 rotated in the clockwise direction to move upper leaf 2 of hinge 1 together with vacuum cup 71 in the upstream direction, to open the hinge and leave the formerly upper leaf 2 lying against belts 41 in the upstream direction.

Turning devices 60 and 61 will act in response to a signal provided by sensor array for each hinge dispensed as to the location of the hinge joint for the respective hinge, either on the upstream or downstream side of the hinge. For each hinge passing to leaf turner 19 along pathway 16 for which the hinge joint was signaled to be on the downstream side, downstream leaf turning device 60 will be activated to turn the upper leaf of the hinge in the downstream direction to open the hinge. And for each hinge for which the hinge joint was signaled to be on the upstream side, upstream leaf turning device 61 will be activated to turn the upper leaf of the hinge in the upstream direction to open the hinge.

Opened hinges 1 move on along pathway 16 from leaf turner 19 to stacker 21. As seen in FIGS. 12A through 13D, stacker 21 comprises three subassemblies: carriage 77, lever 78 and grab 79. Stacker 21 is located close to the downstream end of conveyor 40 and overlies belts 41.

Figure 12A:
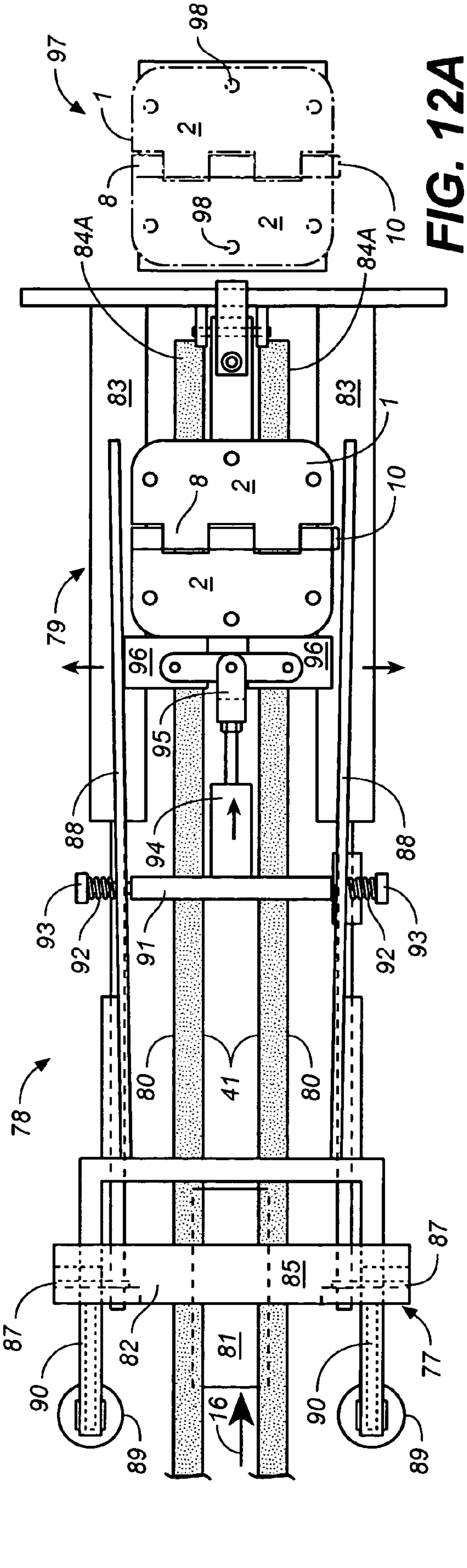
FIG. 12A is an expanded and more detailed fragmentary overhead view of the apparatus of FIGS. 1A and 1B showing the stacker for lifting hinges from the conveyor and depositing them on a receiver.
Figure 13A:
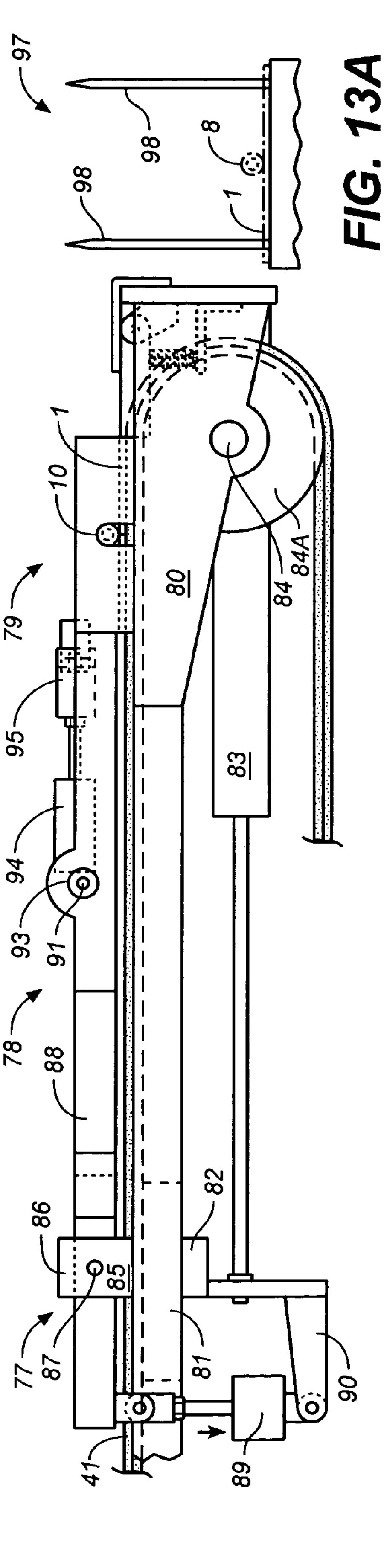
FIG. 13A is an expanded and more detailed fragmentary side view of the apparatus of FIGS. 1A and 1B showing the stacker for lifting hinges from the conveyor and depositing them on a receiver, with the stacker in the lowered and retracted position, with the stacker arms in the spread position to permit a hinge to be moved along the conveyor to a position adjacent the arms for grasping by the stacker.
Figure 12B:
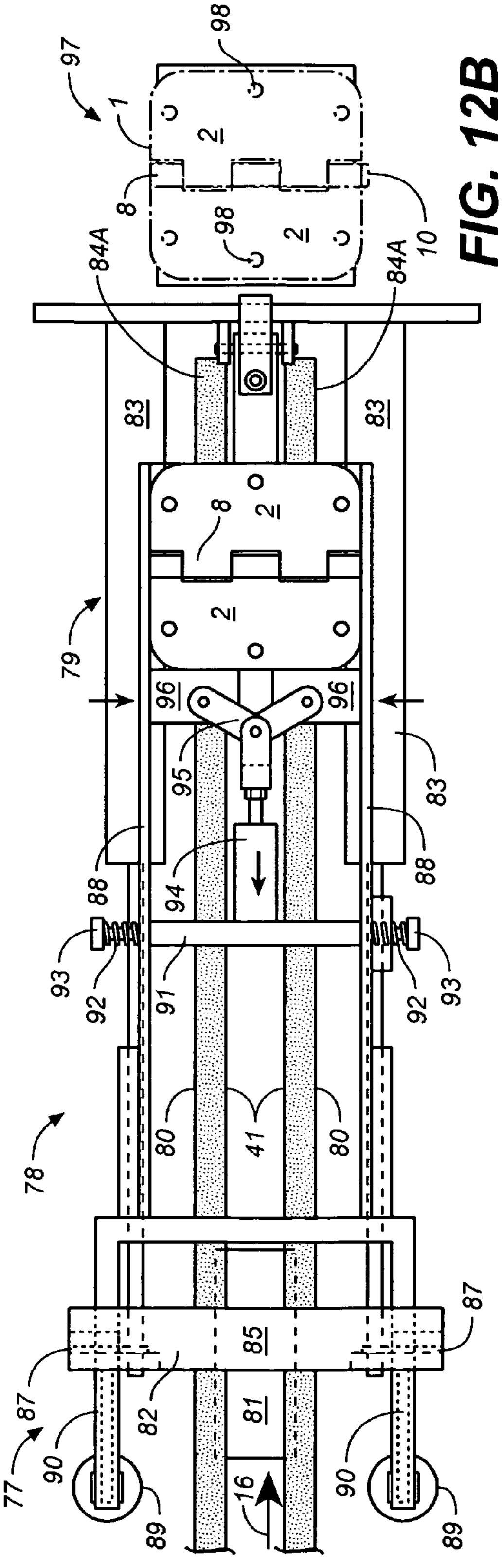
FIG. 12B is the same view as in FIG. 12A, but with the stacker arms in the closed position grasping a hinge therebetween.
Figure 13B:
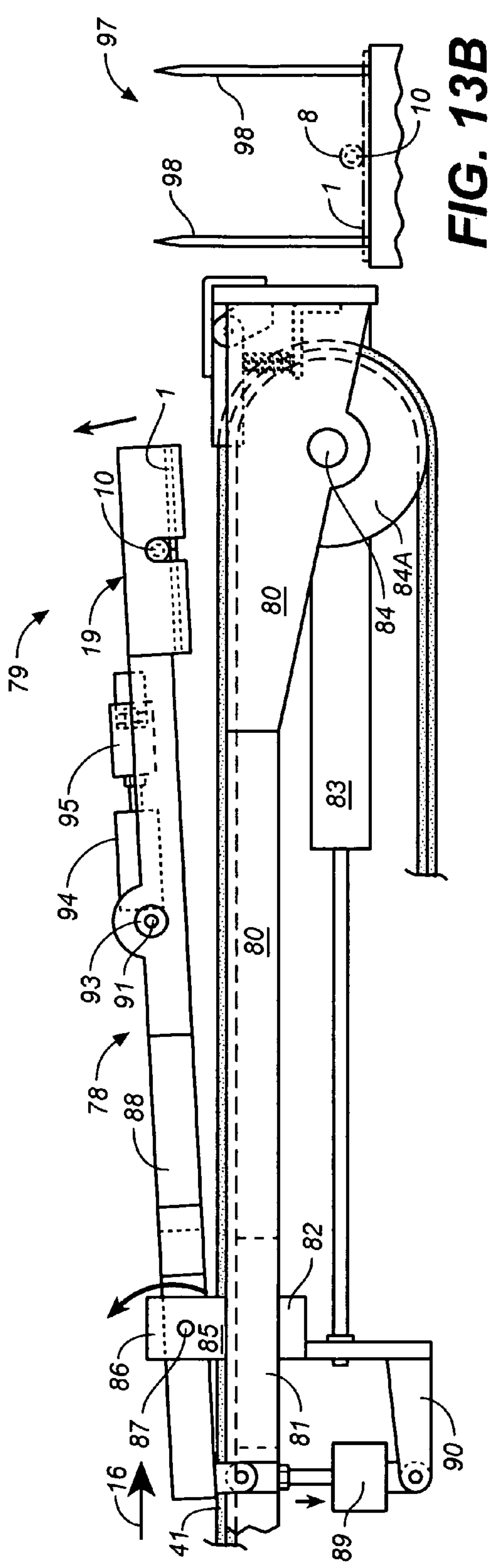
FIG. 13B is the same view as in FIG. 13A, but with the stacker arms in the closed position grasping a hinge therebetween.
Figure 12C:
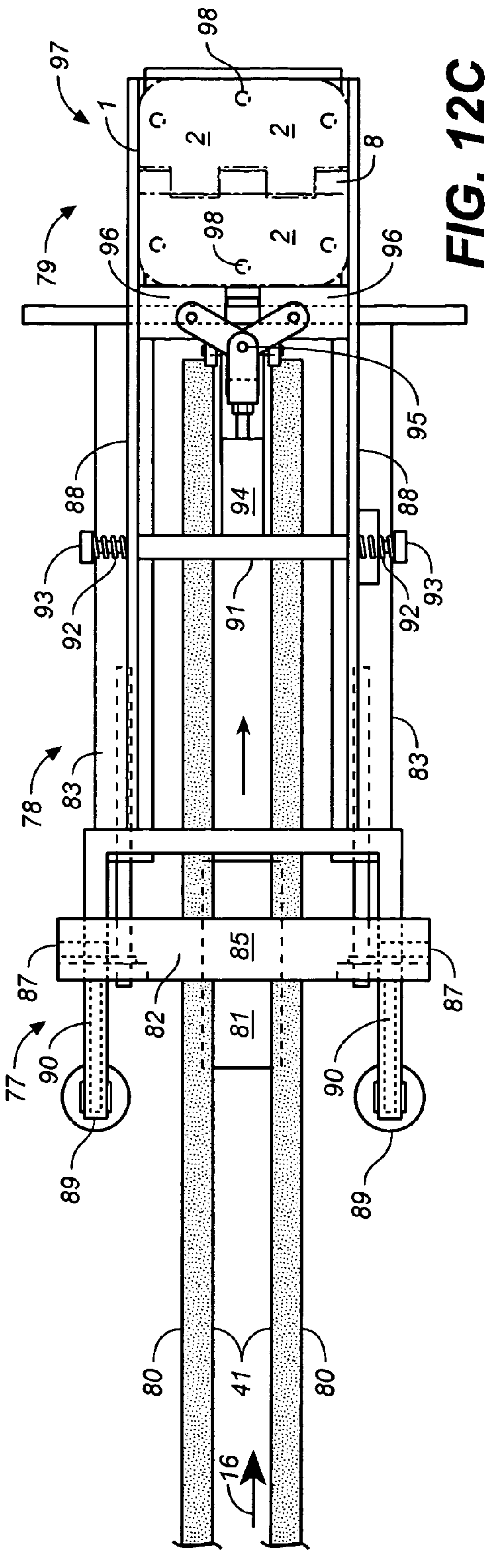
FIG. 12C is the same view as in FIG. 12A, but with stacker in the raised and extended position over the receiver and the stacker arms grasping a hinge therebetween.
Figure 13C:
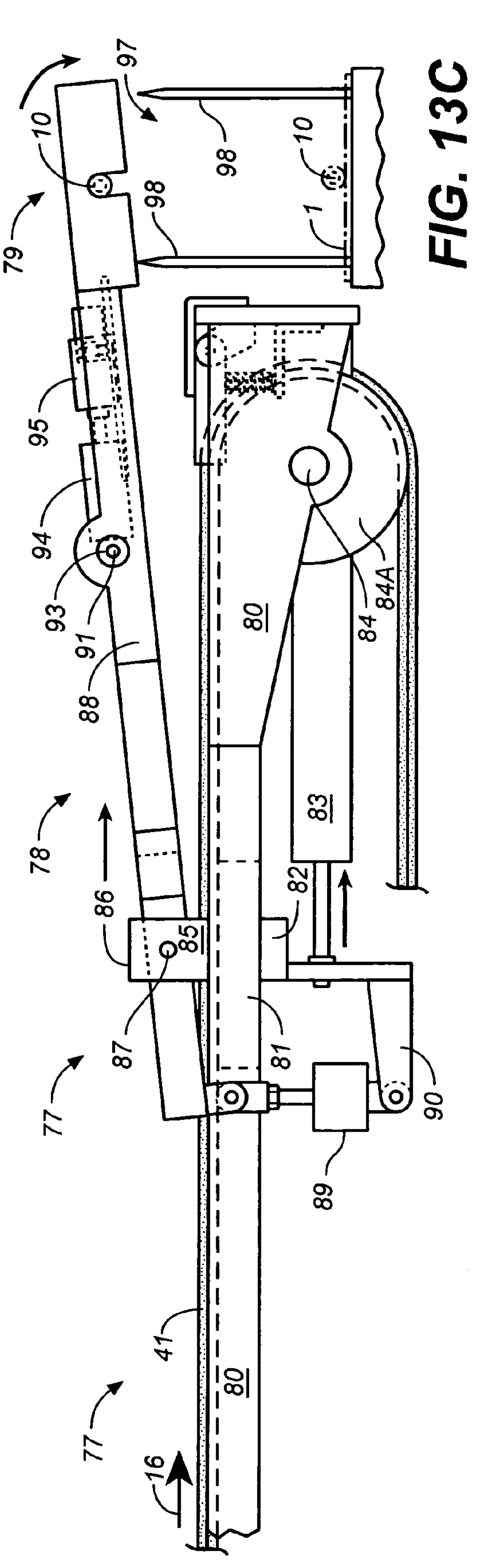
FIG. 13C is the same view as in FIG. 13A, but with stacker in the raised and extended position over the receiver and the stacker arms grasping a hinge therebetween.

A supporting strut 80 of conveyor 40 at either side of belts 41 extend along pathway 16 and provide support for carriage 77. Specifically, guide block 81 is attached to bearing 82 of carriage 77 for supporting stacker 21 on conveyor 40. Block 81 nests between struts 81 below belts 41 and has a flange at either side extending along the pathway direction that fits into a respective keyway also extending the pathway direction in the inner side of each strut 80, thus permitting carriage 77 to slide along struts 80 in the pathway direction. A pair of pistons 83, one at either side of belts 41, extend along the pathway for sliding carriage downstream along the pathway direction between a pickup position and a deposit position. Each piston 83 is attached at one end to conveyor 40 at the axle 84 for pulleys 84A and at the other to bearing 82. Pistons may be operated to move carriage 77 and stacker in the pathway direction between a gripping position, as shown in FIGS. 12A and 13A, and a stacking position, as shown in FIGS. 12C and 13C.

Bearing 82 includes a yoke 85 having a pair of uprights 86 straddling struts 80, each extending above belts 41. An axle 87 is secured between uprights 86 horizontally and transverse to the pathway to act as the fulcrum for lever 78. Lever 78 has a pair of arms 88 that straddle struts 80 and are mounted for rotation on respective axles 87 each axle supported by a respective upright 86.

Each arm 88 extends from respective axles 87 in the pathway a distance in the downstream direction and a shorter distance in the upstream direction. Each upstream end of arms 88 is connected to a respective vertical piston 89 that is, in turn, connected to an upstream projection 90 of bearing 82. The distance of axle 87 on uprights 86 above belts 41 is such that arms 88 may extend parallel with and immediately above belts 41 in a gripping position immediately adjacent to the path of a respective end of a passing hinge 1, as shown in FIGS. 12A and 13A. By actuating pistons 89, arms may be raised to a lift position for movement of carriage 77 to the stacking position.

The downstream extensions of arms 88 together serve as the gripping elements of grab 79. A bolt 91 extends between and through each arm 88 with a circular compression spring 92 encircling the bolt at the outside of each arm 88. A cap 93 at either end of bolt 91 retains springs 92 in place. Piston 94 extends forward from middle of bolt 91 and through scissors link 95 operates against a pair of blocks 96, each attached to a respective arm 88 to urge arms to closer together to a gripping position. Springs 92 normally bias arms 88 apart to a receiving position, when piston 94 has not been activated, so that there is some clearance between arms 88 and the end edges of a hinge 1 moving adjacent arms 88 along pathway 16.

Figure 12D:
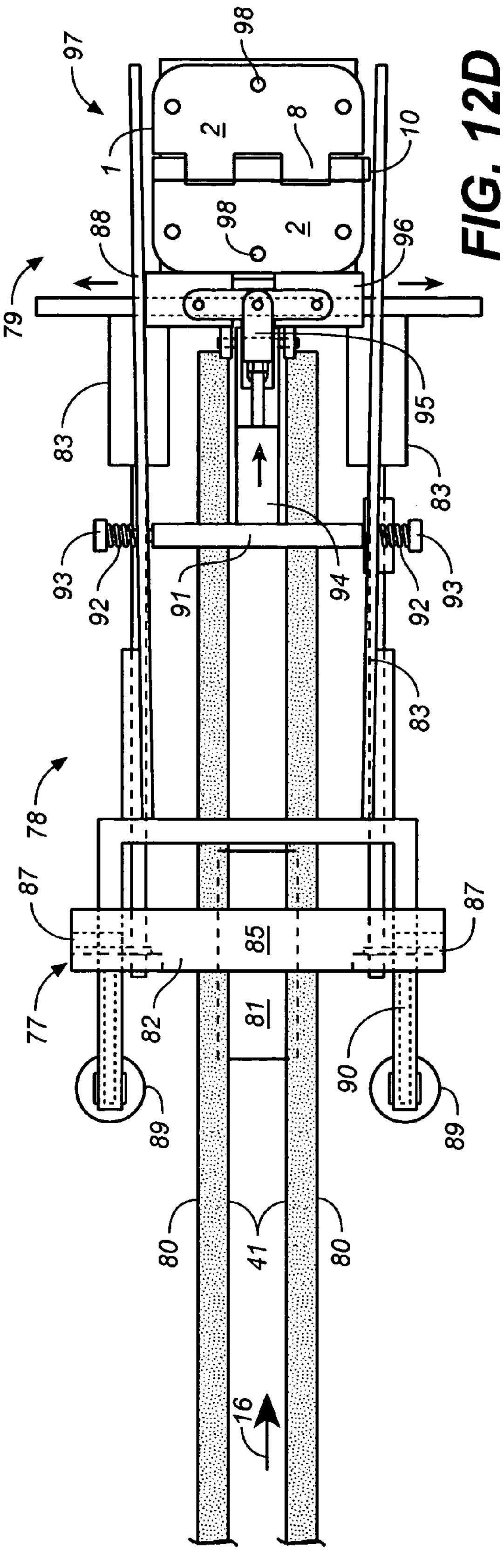
FIG. 12D is the same view as in FIG. 12C, but with stacker in the lowered and extended position and the stacker arms in the spread position to release the hinge grasped therebetween to drop into the receiver.
Figure 13D:
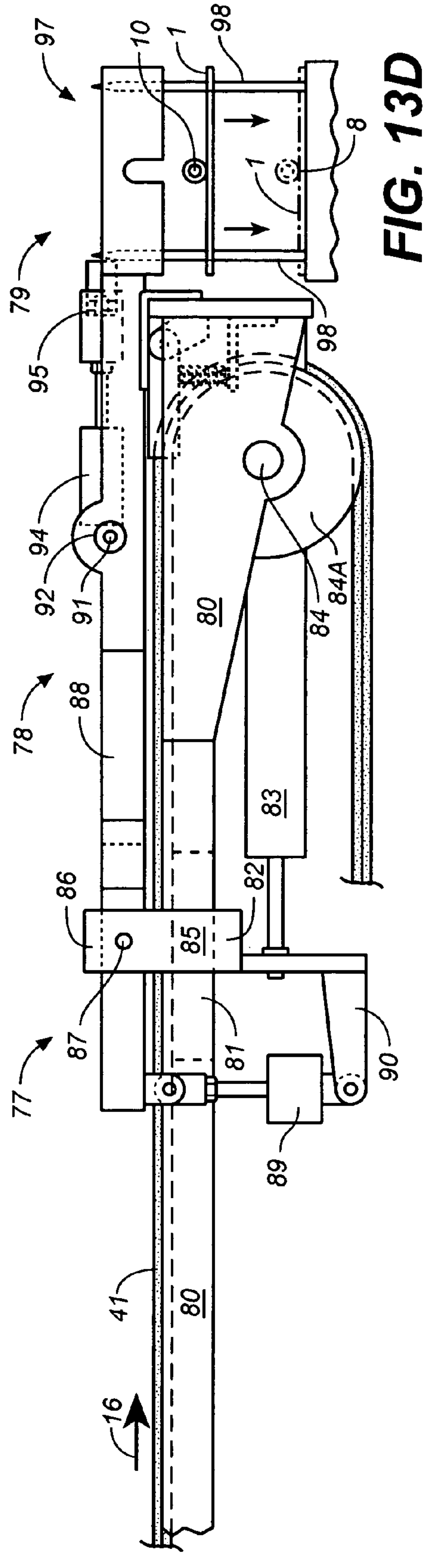
FIG. 13D is the same view as in FIG. 13C, but with stacker in the lowered and extended position and the stacker arms in the spread position to release the hinge grasped therebetween to drop into the receiver.

In the stacking operation both carriage 77 and grab 79 are first in their respective gripping positions and grab 79 is at its receiving position as seen in FIG. 12A. Stacker may be triggered to have grab 79 moved to the gripping position by operating piston 94 when a hinge 1 moving along pathway 16 reaches grab 79, to thereby grip hinge 1 at its opposing ends 6 and 7 as seen in FIG. 12B. Then by operating pistons 89 arms 88 and grab 79 may be elevated to the raised position, as seen in FIG. 13B. Carriage 77 can then be moved to its forward position by operation of pistons 83 as seen in FIGS. 12C and 13. This brings grab 79 downstream beyond conveyor 40. As seen in FIG. 13C a hinge magazine 79 may be position relative to hinge feeder 12 so that it is immediately below grab 79, when carriage 77 is at the forward position, with the stacking pins 98 of magazine in register with screw openings in the leaves 2 of a hinge 1 held by grab 79. Then, as seen in FIG. 12D, arms 88 of grab 79 to the receiving position by operating piston 94 to release hinge 1 hinge 1 then drops onto the stack in magazine 97, as seen in FIG. 13D.

Another embodiment of the invention is depicted in FIGS. 14A through 15E. This embodiment generally employs the apparatus of the first described embodiment. However, in this alternate procedure after the dispensed hinges are each sensed to determine whether the hinge joint is on a selected side or the side opposite and whether the top end is at a selected side or the side opposite. Following this they are each oriented so that they all have their hinge joints at a selected side, either on the upstream side or the downstream side. The hinges are then sequentially opened by turning the upper leaf of each in the same direction, i.e. in the direction of the selected hinge joint side. Those opened hinges not having their top ends at the selected side are then turned to thereby bring all of the hinges processed to the same selected side. Thus, all of the hinges passing to the stacker are opened and have the same orientation.

To illustrate this embodiment, FIGS. 15A through 15D show, in the first column under "Dispenser" closed hinges 1 in each of the four possible alternative orientations. The hinges are first sensed to determine these orientations, and particularly the side of hinge joint and the side of the top end of each relative to the pathway.

The choice and selection of the top end location for all of hinges for this alternative procedure is also determined based upon the orientation of the hinges needed for feeding them the hinger or other destination.

Selection of the orientation of the hinge joint of all of the hinges is determined in this alternative procedure by the direction in which the hinges are all to be opened. If as in this example all of the hinges are to be opened in the downstream direction, then the all of the hinges must be oriented to be on the downstream side. However, if a single leaf turning device were employed that was arranged to open hinges in the upstream direction (such as in the case of leaf turning device 61 in the first embodiment) then all of the hinges must be oriented by the rotator station 18' to be opened in the upstream direction.

Figures 15A, 15B, 15C, 15D:
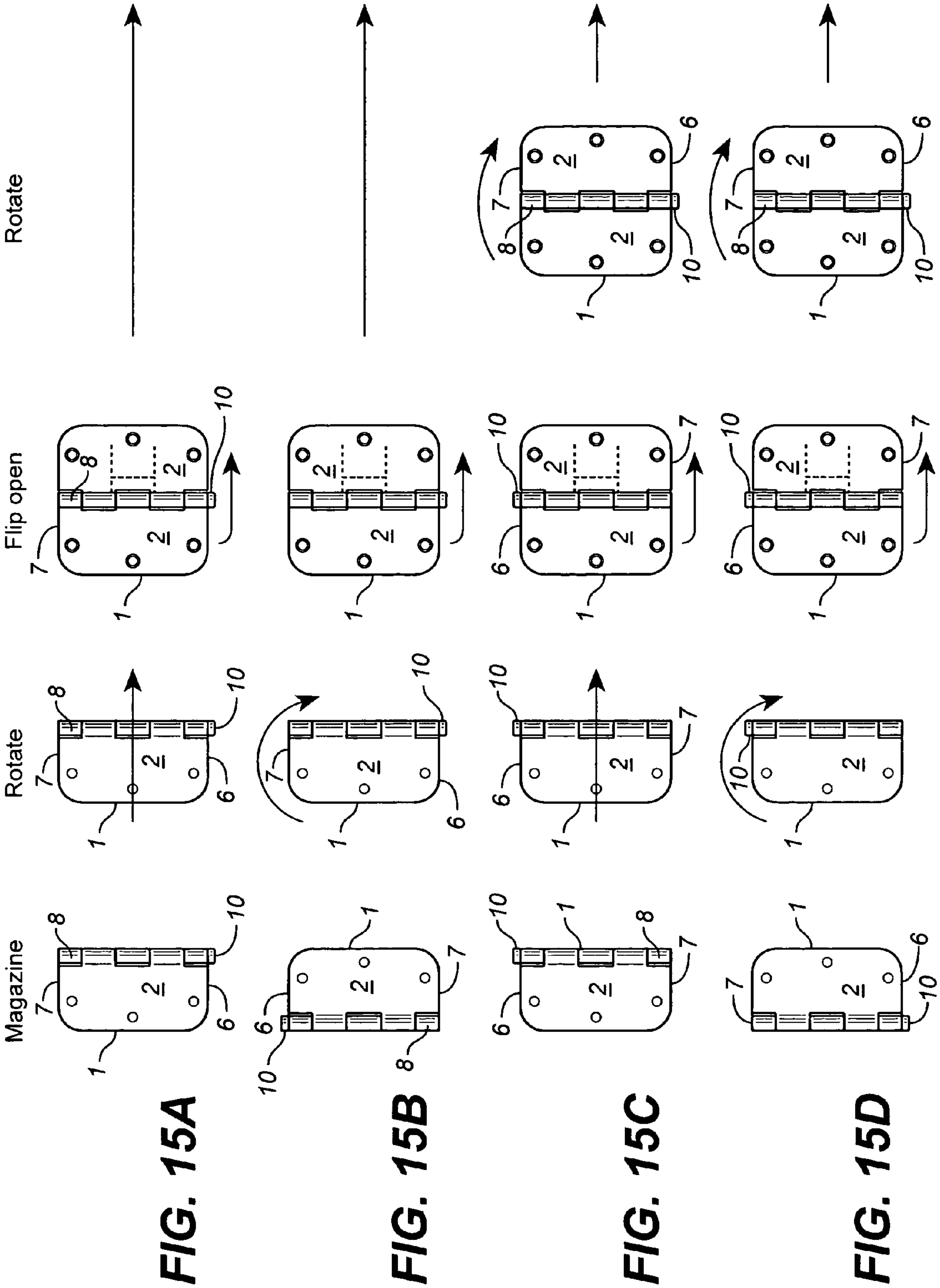
FIG. 15A through 15D illustrate the procedure of the second embodiment of the invention for orienting and opening hinges, showing hinges progressively being oriented and opened.

Following dispensing and sensing of the hinges, as seen in the second column under "Rotate," the hinges of the rows of 15B and 15C are each rotated to bring their hinge joints 8 to the selected side. Next, as seen in the column headed Flip open," all of the hinges have been opened by turning the upper leaves in the direction of their hinge joints 8. Following this, since top ends 6 of the opened hinges of FIGS. 15C and 15C are not on the selected side, as determined by the sensor array, they are each rotated 180 degrees to thereby bring all of the hinges to the proper orientation of their top ends.

Figure 15E:
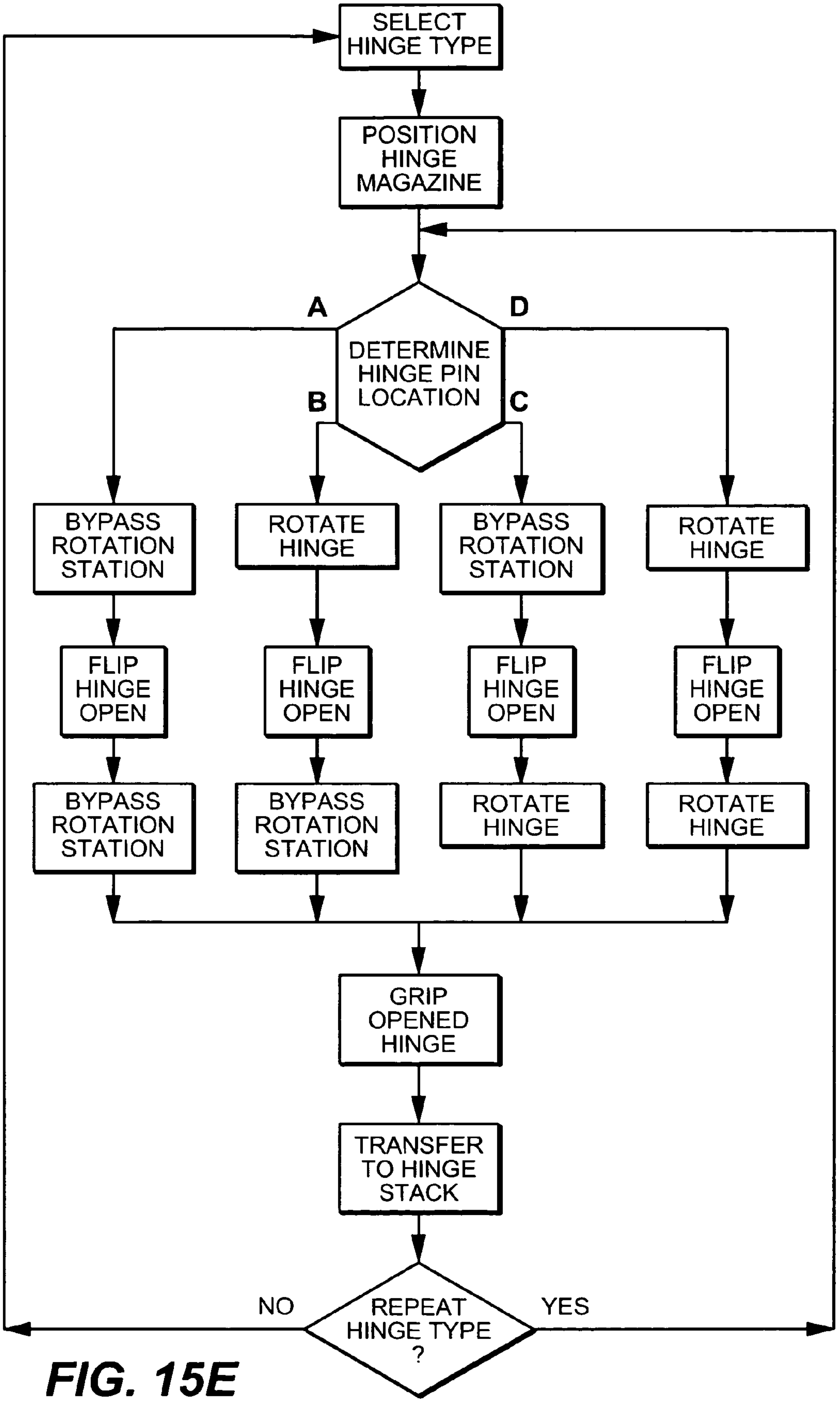
FIG. 15E is a block diagram illustrating the procedure of dispensing, orienting, opening and stacking hinges in the embodiment of FIGS. 14A through 14D.

A self-explanatory flow diagram of the foregoing procedure is seen in FIG. 15E.

Figure 14A:
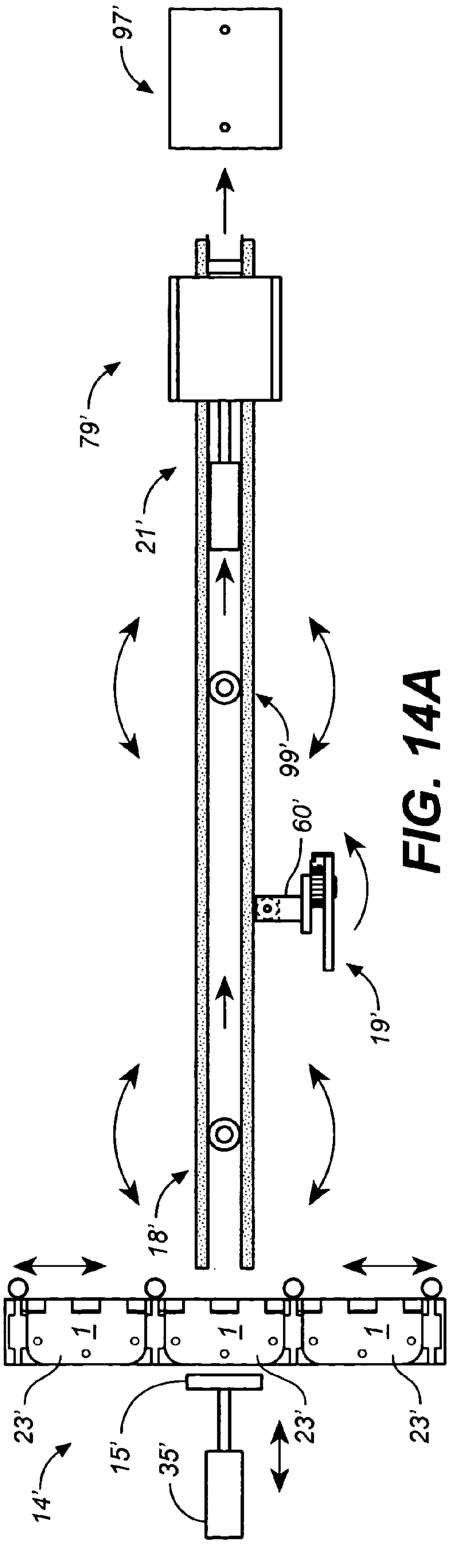
FIG. 14A is an overhead view of a second embodiment of the apparatus of the present invention for forming a stack of closed hinges, sensing the orientation of individual hinges in the stack, consecutively separating individual sensed hinges from the stack, orienting the hinges for placement in a receiver opening the hinges, and depositing the hinges in a receiver.
Figure 14B:
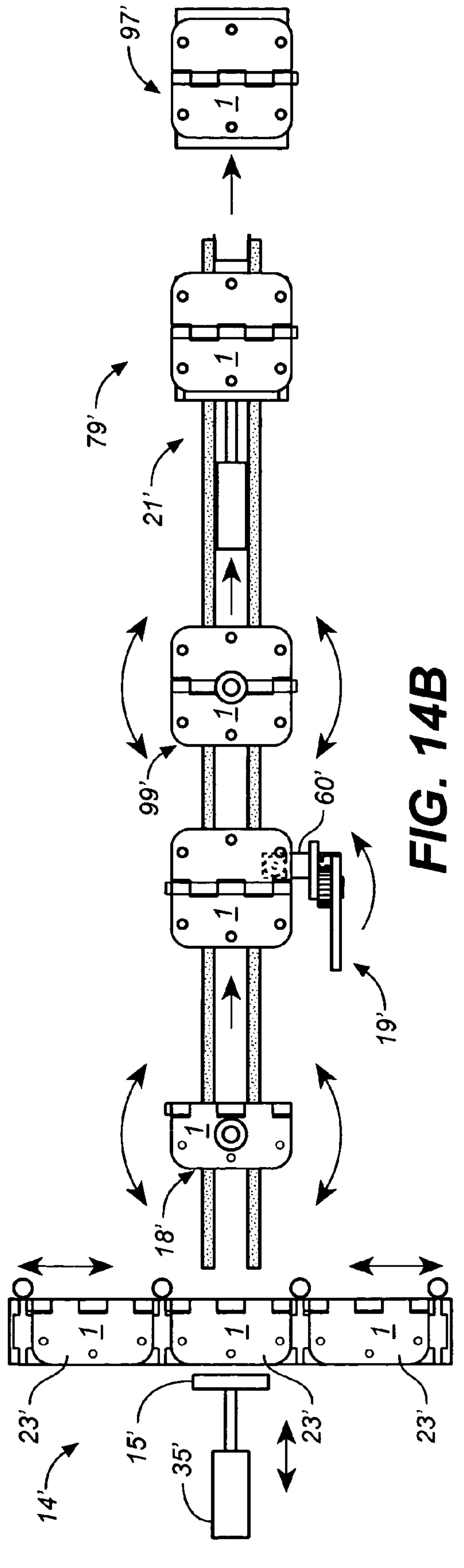
FIG. 14B is the same overhead view of the apparatus as in FIG. 14A showing hinges separated from the stack and progressing through the sensing, opening, orientation and depositing of the separated hinges.

Referring now to FIGS. 14A and 14B, the apparatus for carrying out the alternative procedure is identical to that for embodiment of 14A through 13D except as follows. An additional rotator station 99' is located downstream of leaf turning device 60' for rotating the opened hinges 1 not having their top ends 6 at the selected side and leaf turner 19' consists of only one leaf turning device 60'.

Rotator station 99' has the same construction as rotator station 18'. However, since leaf turner 60' is positioned to turn only hinges with their hinge joints 8' on the downstream side, rotator station 18' is set up to be activated, in response to the sensor array, to turn all hinges with upstream hinge joints so that all hinges reaching leaf turner 60' have their hinge joints 8' on the downstream side. In the use of rotator station 18' conveyor belt 40' is stopped for the turning operation at a position where vacuum cup 65' is located, in the pathway direction, midway between the hinge joint 8 and the opposed free side margin of upstream leaf 2 of the open hinge. The hinge is then rotated about the surface of belts 41' to bring the top side of the hinge to the opposite side of the pathway.

Other embodiments of the invention may employ rotators and leaf turners all located at the same site along the pathway. For example, in the embodiment of FIGS. 1A through 13D the rotator station 18 and leaf turner 19 may together be replaced by a single station combining the functions of both Thus, for such a single station the apparatus of rotator station 18 may employed with the following modifications. Leaf turning devices 60 and 61 of leaf turner 19 may be placed at rotator station 18, except for vacuum cup 65 and its vacuum source 67, which are omitted. Instead, turntable 52, with its vacuum source, may be used both for rotating hinges and for securing the lower leaf of the hinge during leaf turning by either leaf turning device 60 or 61. Thus, with this single station modification, a closed hinges arriving at the station from the dispenser is first rotated, as appropriate, based on the orientation of the hinge determined by the sensor array as previously described. Then with hold down 56 is raised to its retracted position and turntable 52 still with a vacuum under the lower leaf of the hinge, either leaf turning device 60 or 61, as appropriate to the sensed hinge joint position, opens the hinge as previously described. The thus oriented and opened hinge then proceeds directly to stacker 21.

The sensing position for each hinge to be sensed for location of the pinhead and the hinge joint may be, as described here, at the beginning of the pathway where the lower-most hinge in the stack is sensed before being pushed out of the stack and along the pathway. Alternatively, each hinge may be sensed at any position along the pathway up to and at the rotating station. Other types of sensors may be employed for detecting the presence or absence of a pinhead at the four corner positions, using mechanical detectors or electricity, light or other energy rays commonly employed.

Instead of a belt conveyor other conveying devices may employed, such as those that would push, pull or carry hinges downstream along the pathway from the dispenser. For the ease of transfer, the pathway is desirably horizontal and straight. In this fashion the uniform orientation given to hinges at the dispenser becomes the same as the predetermined orientation when the hinge reaches the receiver. For simplicity and ease of use, the orientation at the dispenser, rotators and leaf turners is with the hinge joint and margin transverse to the pathway.

For some applications an abbreviated version of the hinge feeder of this invention may be desirable. In this version the foregoing stacker may be employed for feeding hinges to a magazine or the like without the orienting and opening functions of the foregoing embodiment. In this version hinges are first oriented and opened by hand and then sequentially placed manually on conveyor 40 with the hinge joint 8 transverse to the pathway direction and with orientation of the top end 6 to the proper side of the pathway 16. For this application the dispensing unit, rotator station and leaf turning station may be simply be omitted. Also, even with hinge feeder 1 it may be desirable occasionally, e.g. for short runs of a few doors using hinges of a special color or design, to bypass the dispenser, and rotator and leaf turner to open, orient and feed the hinges by hand, opened and properly oriented, onto the conveyor between the leaf turner and the stacker.

The invention claimed is:

1. A hinge feeder for sequentially opening and orienting pin-jointed butt hinges each hinge, having a pinhead at the top thereof, and for delivering the opened and oriented hinges to a receiver at a predetermined orientation with the top of each hinge at the same selected end of the hinge, comprising:

a. a pathway for transporting hinges from a dispenser, the pathway extends from the dispenser in a downstream direction to a receiver;

b. a dispenser adapted to hold a stack of closed hinges, to position the lower-most hinge in the stack with the end margins thereof at a uniform orientation except for the location of the top of the hinge, the top being, variably, at one or the other end of the hinge, and to sequentially dispense the lower-most from the stack and along the pathway at the uniform orientation;

c. a sensor located and adapted for sensing the position of the pinhead at the top of a folded hinge when the hinge is at a sensing position along the pathway;

d. a rotator on the pathway, at or downstream of the sensing position, for orienting hinges transported downstream along the pathway and wherein the rotator is adapted to rotate selected hinges, in response to the sensed position of the top of that hinge, to reverse the positions of the respective hinge ends;

e. at least one leaf turner on the pathway at or downstream of the sensor adapted for opening hinges transported downstream along the pathway; and f. a receiver along the pathway downstream of the rotator and leaf turner adapted for receiving opened and oriented hinges in a stack.

2. A hinge feeder as in claim 1 and wherein the sensor comprises a sensing element at the location of each hinge end margin at the hinge joint of a closed hinge resting at a sensing position on the pathway, both for hinges oriented with the hinge joint at one side margin or with the hinge joint at the other side margin of the hinge.

3. A hinge feeder as in claim 2 and wherein the sensing position is at the dispenser and the sensing elements each comprise an electrical contact of an electrical circuit, each contact positioned to make contact with the pinhead of the hinge, if present at the respective corner, but out of contact with the remainder of the hinge whereby to complete an electrical sensing circuit for sending a sensing signal for controlling the operation of the rotator and the turner.

4. A hinge feeder as in claim 2 and further including means for moving hinges downstream along the pathway from the dispenser to the receiver.

5. A hinge feeder as in claim 4 and wherein the hinge moving means comprises an endless conveyor.

6. A hinge feeder as in claim 4 and wherein, at the uniform orientation at which each hinge is dispensed, the hinge joint margins are transverse to the downstream direction of the pathway and the hinge moving means presents each hinge at each rotator and leaf turner with the hinge joint margin transverse to the pathway.

7. A hinge feeder as in claim 6 and wherein the leaf turner is adapted for activation for a hinge presented at the leaf turner having the hinge joint side edge on the downstream side to move the free side of the upper leaf up from the lower leaf and in the downstream direction and for activation for a hinge presented at the leaf turner having the hinge joint side on the upstream side to move the free side of the upper leaf of a hinge presented at the leaf turner up from the lower leaf and in the upstream direction, whereby to alternatively open hinges at the leaf turner with the upper leaf in the downstream and upstream directions, respectively.

8. A hinge feeder as in claim 7 and wherein the leaf turner comprises a first suction device for creating a zone of reduced pressure at the upper surface of the upper of the upper leaf of a closed hinge to cause the upper leaf to adhere to the device for opening a closed hinge lying in the pathway at the leaf turner with the hinge joint at the downstream side edge, the suction device being supported for movement in an arcuate path from a position at the upper surface of the upper leaf for attaching to the upper leaf of the hinge and a position downstream of the joint of the hinge for detaching from the upper leaf, for moving an attached upper leaf of the hinge downstream to the open position and a second suction device for creating a zone of reduced pressure at the upper surface of the upper leaf of a closed hinge to cause the upper leaf to adhere to the device for opening a closed hinge lying in the pathway at the leaf turner with the hinge joint at the upstream side edge, the suction device being supported for movement in an arcuate path from a position at the upper surface of the upper leaf for attaching to the upper leaf of the hinge and a position upstream of the joint of the hinge for detaching from the upper leaf, for moving an attached upper leaf of the hinge upstream to the open position.

9. A hinge feeder as in claim 1 and wherein the rotator is adapted for activation, in response to a sensor signal that the top of a hinge is at the non-selected end of the hinge, to rotate that hinge to bring the top of the hinge to the selected end of the hinge.

10. A hinge feeder as in claim 9 and wherein the rotator further comprises a turntable adapted to support a closed hinge with the leaves in the horizontal plane, to apply a zone of reduced pressure at the underside of the hinge to hold the hinge to the turntable and turn the hinge one hundred eighty degrees about itself in the plane of the leaves.

11. A hinge feeder as in claim 1 and further including a depositing device adapted for picking up the opened and oriented hinge in a horizontal attitude from the pathway downstream of the rotator and moving the hinge from the pathway to a position adjacent the receiver, while maintaining the hinge at the horizontal attitude, and releasing the hinge to deposit the hinge at the receiver.

12. A hinge feeder as in claim 11 and wherein the depositing device grasps the hinge at the leaf end edges.

13. A hinge feeder as in claim 1 and wherein the leaf turner comprises at least one suction device for creating a zone of reduced pressure at the upper surface of the upper surface of the upper leaf of a closed hinge to cause the upper leaf to adhere to the device for opening a closed hinge lying in the pathway at the leaf turner with the hinge joint at the upstream side of the leaves, the suction device being supported for movement in an arcuate path in the direction of the hinge joint from a position at the upper surface of the upper leaf, for attaching to the upper leaf of the hinge, and a position past the hinge joint, for detaching from the upper leaf, to thereby move the attached upper leaf of the hinge to the open position.

14. A hinge feeder as in claim 1 and further including multiple dispenser chambers, each alternatively moveable between a position on the pathway at or upstream of the sensor and a reserve position off of the pathway, for receiving closed hinges to form a stack of hinges, each dispenser being adapted to support a stack of closed hinges and to guide the hinges in the stack to orient the hinge joint of the lower-most hinge to be transverse to the downstream direction of the pathway, and propelling means at the pathway position to propel the lower-most hinge out of a chamber at the pathway position in the downstream direction along the pathway.

15. A hinge feeder as in claim 1 and wherein:

a. the rotator is adapted for activation, in response to a sensor signal that the hinge joint of a hinge is adjacent the side edge of the hinge opposed to a selected side edge for the hinge joint, to rotate that hinge to reverse the hinge joint position to the other side edge of the hinge and b. further comprising a second rotator on the pathway at or downstream of the rotator and upstream of the receiver for orienting hinges opened by the hinge opener, the second rotator being adapted for activation, in response to a sensor signal that the top of a hinge is at the selected end of the hinge and that the joint is adjacent the side edge of the hinge opposed to the selected side edge, to rotate that hinge to bring the top of that hinge to the selected end.

16. A hinge feeder as in claim 15 wherein, at the uniform orientation at which each hinge is dispensed, the hinge joint margins are transverse to the downstream direction of the pathway and further including means for moving hinges downstream along the pathway from the dispenser to the receiver and presenting each hinge at each rotator and leaf turner with the hinge joint margin transverse to the pathway.

17. A hinge feeder as in claim 16 wherein the leaf turner is adapted to move the free side the upper leaf of each hinge up from the lower leaf and in the direction of the hinge joint of the selected side edge to thereby rotate the upper leaf about the hinge joint to the open position.

18. A hinge feeder as in claim 1 further comprising a stacker and wherein the receiver comprises a magazine, the magazine having guide elements for receiving and holding, in a stack, opened hinges consecutively lowered into the magazine in register with the guide elements, comprising a stacker adapted for picking up from the pathway an opened and oriented hinge with both hinge leaves in a horizontal attitude and moving the hinge from the pathway to a position above the magazine that brings the hinge in to register with the guide elements, while maintaining the hinge leaves at the horizontal attitude, and releasing the hinge to deposit the hinge in the magazine.

19. A hinge feeder as in claim 18 and wherein the stacker is adapted to apply an upward force simultaneously to both leaves of the hinge to hold both the leaves at horizontal attitude and to simultaneously release the force on both leaves so that hinge drops in the horizontal attitude onto the stack.

20. A hinge feeder for feeding hinges to a magazine as in claim 19 and wherein the stacker grasps the hinge at both ends of each leaf.

21. A hinge feeder for feeding hinges to a magazine as in claim 19 and wherein the stacker is adapted to apply a suction on the upper side of each leaf to hold both the leaves at a horizontal attitude and to simultaneously release the suction on each leaf.

* * * * *